US012797830B2

(12) United States Patent
Kato et al.

(10) Patent No.: US 12,797,830 B2
(45) Date of Patent: Nov. 17, 2026

(54) METHOD OF CATALYTIC HYDROGENATION AND REDUCTION

(71) Applicant: ORGANO CORPORATION, Tokyo (JP)

(72) Inventors: Ayumu Kato, Tokyo (JP); Shinji Nakamura, Tokyo (JP); Hitoshi Takada, Tokyo (JP); Hironao Sajiki, Gifu (JP); Tsuyoshi Yamada, Gifu (JP); Kwihwan Park, Gifu (JP); Yutaro Yamada, Gifu (JP)

(73) Assignee: ORGANO CORPORATION, Tokyo (JP)

( * ) Notice: Subject to any disclaimer, the term of this patent is extended or adjusted under 35 U.S.C. 154(b) by 447 days.

(21) Appl. No.: 18/568,885

(22) PCT Filed: Jan. 18, 2022

(86) PCT No.: PCT/JP2022/001509
§ 371 (c)(1),
(2) Date: Dec. 11, 2023

(87) PCT Pub. No.: WO2022/264471
PCT Pub. Date: Dec. 22, 2022

(65) Prior Publication Data

US 2024/0278214 A1 Aug. 22, 2024

(30) Foreign Application Priority Data

Jun. 17, 2021 (JP) ................................ 2021-101092

(51) Int. Cl.
*B01J 23/40* (2006.01)
*B01J 31/08* (2006.01)
(Continued)

(52) U.S. Cl.
CPC ............... *B01J 23/40* (2013.01); *B01J 31/08* (2013.01); *B01J 35/45* (2024.01); *B01J 35/56* (2024.01);
(Continued)

(58) Field of Classification Search
CPC ... B01J 23/40; B01J 23/42; B01J 23/44; B01J 31/08; B01J 35/393; B01J 35/45;
(Continued)

(56) References Cited

U.S. PATENT DOCUMENTS 4,853,135 A 8/1989 Oeckl et al.

FOREIGN PATENT DOCUMENTS

EP 4 279 177 A1 11/2023
JP 62-279844 A 12/1987
(Continued)

OTHER PUBLICATIONS

Machine translation of Takada et al (JP 2014030820). (Year: 2014).*
(Continued)

*Primary Examiner* — Brian A Mccaig
(74) *Attorney, Agent, or Firm* — GREENBLUM & BERNSTEIN, P.L.C.

(57) ABSTRACT

A method of catalytic hydrogenation and reduction in which a reactive substrate and a hydrogen source are brought into contact in the presence of a platinum-group metal-supported catalyst to run the reactive substrate through catalytic hydrogenation and reduction; the ion exchanger is made of a continuous skeleton phase and a continuous hole phase; the thickness of the continuous skeleton is in the range of 1-100 μm; the average diameter of the continuous holes is in the range of 1-1000 μm; the total pore volume is in the range of 0.5-50 mL/g; the ion exchange capacity per unit weight in a dry state is in the range of 1-9 mg eq/g; and the ion exchanger is a non-particulate, weakly basic, organic porous
(Continued)

ion exchanger where an ion exchange group is distributed in the ion exchanger.

8 Claims, 17 Drawing Sheets

(51) Int. Cl.

| | |
|---|---|
| ***B01J 35/45*** | (2024.01) |
| ***B01J 35/56*** | (2024.01) |
| ***B01J 35/63*** | (2024.01) |
| ***B01J 35/64*** | (2024.01) |

(52) U.S. Cl.
CPC ........... *B01J 35/635* (2024.01); *B01J 35/638* (2024.01); *B01J 35/657* (2024.01); *B01J 2231/60* (2013.01); *B01J 2235/00* (2024.01); *B01J 2235/30* (2024.01)

(58) Field of Classification Search
CPC ........ B01J 35/56; B01J 35/635; B01J 35/638; B01J 35/647; B01J 35/651; B01J 35/657; B01J 37/16; B01J 37/30; B01J 2231/60; B01J 2235/00; B01J 2235/30; C07B 35/02; C07B 41/02; C07B 43/04; C07C 5/08; C07C 29/145; C07C 37/055
See application file for complete search history.

(56) References Cited

FOREIGN PATENT DOCUMENTS

| | | | |
|---|---|---|---|
| JP | 2008-114164 | A | 5/2008 |
| JP | 2014-030820 | A | 2/2014 |
| JP | 2014-30821 | A | 2/2014 |
| JP | 2018-96879 | A | 6/2018 |
| WO | 2006/028146 | A1 | 3/2006 |

OTHER PUBLICATIONS

Office Action, dated Apr. 15, 2025 in Japanese family member Application No. 2021-101092, with English language translation thereof.

Yasunari Monguchi, et al., and "Amphipathic monolith-supported palladium catalysts for chemoselective hydrogenation and cross-coupling reactions", RSC Advances, 2017, and vol. 7, No. 4 and pp. 1833-1840.

Extended European Search Report dated May 7, 2025 in European family member application No. 22824474.5.

International Search Report issued in International Bureau of WIPO Patent Application No. PCT/JP2022/001509, dated Mar. 29, 2022 with an English translation thereof.

International Preliminary Report on Patentability dated Dec. 14, 2023 and Written Opinion dated Mar. 29, 2022 (with an English translation thereof) issued in International Bureau of WIPO Patent Application No. PCT/JP2022/001509.

* cited by examiner

Pd NANOPARTICLE-SUPPORTED WEAKLY BASIC MONOLITH ANION EXCHANGER

| | |
|---|---|
| NUMBER OF PARTICLES | 123 |
| AVERAGE (nm) | 4.92 |
| STANDARD DEVIATION (nm) | 0.82 |

Pt ION-SUPPORTED WEAKLY BASIC MONOLITH ANION EXCHANGER EPMA

Pd NANOPARTICLE-SUPPORTED WEAKLY BASIC MONOLITH ANION EXCHANGER

| | |
|---|---|
| NUMBER OF PARTICLES | 119 |
| AVERAGE (nm) | 2.53 |
| STANDARD DEVIATION (nm) | 0.55 |

METHOD OF CATALYTIC HYDROGENATION AND REDUCTION

CROSS REFERENCE TO RELATED APPLICATION

This application is a National Stage of International Application No. PCT/JP2022/001509 filed on Jan. 18, 2022, which claims priority to Japanese Patent Application No. 2021-101092 filed on Jun. 17, 2021, the contents of each of the above-identified applications are incorporated herein by reference in their entirety including the specification, claims, drawings, and abstract.

TECHNICAL FIELD

The present invention relates to a catalytic hydrogenation reduction method using a platinum group metal-supported catalyst.

BACKGROUND ART

Catalytic hydrogenation reaction using heterogeneous catalysts, so-called catalytic reduction reaction, is one of the most important processes in the chemical industry, and is widely used in, for example, hydrogenation or debenzylation reaction of aromatic nitro compounds or unsaturated bonds.

There are proposed, as heterogeneous catalysts for use in catalytic reduction reaction, catalysts where platinum group metals typified by palladium are supported on various carriers. For example, there are known supported catalysts with, as carriers, activated carbon or inorganic carriers such as zeolite, silica, and alumina. In this regard, there are disclosed organic carriers, for example, a particulate MR-shaped weakly basic anion exchange resin (see Patent Document 1), a particulate ion exchange resin with ethylenediamine introduced (see Patent Document 2), a synthetic adsorbent (see Patent Document 3), and a non-particulate strongly basic organic porous anion exchanger or a non-particulate strongly acidic organic porous cation exchanger (see Patent Document 4).

However, the particulate ion exchange resins and the synthetic adsorbent used as the carriers in Patent Documents 1 to 3 usually have a large particle size of several hundred nanometers, and thus suffer not only a problem is that time is taken for substrate diffusion and the contact efficiency with hydrogen is low to lead to a low reaction rate, but also a problem is that a catalyst with the synthetic adsorbent as a carrier has a limitation on usable reaction.

In addition, an ion exchange group of a non-particulate weakly basic organic porous ion exchanger used as the carrier in Patent Document 4 is described to be a strongly basic anion group or a strongly acidic cation group, but no carrier having a weakly basic functional group is described. Moreover, a platinum group-supported catalyst where platinum group metal nanoparticles are supported on the non-particulate strongly basic organic porous anion exchanger or the non-particulate strongly acidic organic porous cation exchanger described in Patent Document 4 is demanded to be further enhanced in catalyst activity.

CITATION LIST

Patent Literature

Patent Document 1: JP 62-279844 A
Patent Document 2: WO 2006/028146

Patent Document 3: JP 2008-114164 A
Patent Document 4: JP 2014-030821 A

SUMMARY

Technical Problem

An object of the present invention is to provide a catalytic hydrogenation reduction method capable of performing catalytic hydrogenation reduction reaction at a high conversion.

Solution to Problem

The present invention relates to a catalytic hydrogenation reduction method comprising contacting a reaction substrate and a hydrogen source in the presence of a platinum group metal-supported catalyst to perform catalytic hydrogenation reduction of the reaction substrate, wherein the platinum group metal-supported catalyst is a platinum group metal-supported catalyst where at least one of platinum group metal ions, platinum group metal complex ions, and platinum group metal nanoparticles having an average particle size in the range of 1 to 100 nm is supported on an ion exchanger, and the ion exchanger is a non-particulate weakly basic organic porous ion exchanger comprising a continuous skeleton phase and a continuous hole phase, in which a thickness of a continuous skeleton is in the range of 1 to 100 μm, an average diameter of continuous holes is in the range of 1 to 1000 μm, a total pore volume is in the range of 0.5 to 50 mL/g, an ion exchange capacity per weight in a dry state is in the range of 1 to 9 mg equivalents/g, and ion exchange groups are distributed in the ion exchanger.

In the catalytic hydrogenation reduction method, preferably, the non-particulate weakly basic organic porous ion exchanger has a continuous macropore structure having macropores connected to each other and common openings having an average diameter in the range of 1 to 1000 μm in walls of the macropores, a total pore volume is in the range of 1 to 50 mL/g, an ion exchange capacity per weight in a dry state is in the range of 1 to 9 mg equivalents/g, and ion exchange groups are distributed in the organic porous ion exchanger.

In the catalytic hydrogenation reduction method, preferably, the non-particulate weakly basic organic porous ion exchanger has a three-dimensionally continued skeleton portion formed by aggregation of organic polymer particles having an average particle size in the range of 1 to 50 μm, and has, between such skeletons, three-dimensionally continued holes having an average diameter in the range of 20 to 100 μm, a total pore volume is in the range of 1 to 10 mL/g, an ion exchange capacity per weight in a dry state is in the range of 1 to 9 mg equivalents/g, and ion exchange groups are distributed in the organic porous ion exchanger.

In the catalytic hydrogenation reduction method, preferably, the non-particulate weakly basic organic porous ion exchanger is a continuous macropore structure body where bubble-like macropores are overlapped and such overlapped portions serve as openings having an average diameter in the range of 30 to 300 μm, a total pore volume is in the range of 0.5 to 10 mL/g, an ion exchange capacity per weight in a dry state is in the range of 1 to 9 mg equivalents/g, ion exchange groups are distributed in the organic porous ion exchanger, and a skeleton portion area appearing in a cross section in an SEM image of a cut surface of the continuous macropore structure body is in the range of 25 to 50% in an image region.

In the catalytic hydrogenation reduction method, preferably, the non-particulate weakly basic organic porous ion exchanger is a co-continuous structure body comprising a three-dimensionally continued skeleton configured from an aromatic vinyl polymer containing a crosslinked structure unit in the range of 0.1 to 5.0% by mol in all constituent units with ion exchange groups introduced, the skeleton having a thickness in the range of 1 to 60 μm, and, between such skeletons, three-dimensionally continued holes having an average diameter in the range of 10 to 200 μm, a total pore volume is in the range of 0.5 to 10 mL/g, an ion exchange capacity per weight in a dry state is in the range of 1 to 9 mg equivalents/g, and ion exchange groups are distributed in the organic porous ion exchanger.

In the catalytic hydrogenation reduction method, preferably, the non-particulate weakly basic organic porous ion exchanger comprises a continuous skeleton phase and a continuous hole phase, the skeleton has a plurality of particle bodies fixed to a surface and having a diameter in the range of 4 to 40 μm or a plurality of protrusion bodies formed on a skeleton surface of the organic porous body and having a size in the range of 4 to 40 μm, an average diameter of continuous holes is in the range of 10 to 200 μm, a total pore volume is in the range of 0.5 to 10 mL/g, an ion exchange capacity per weight in a dry state is in the range of 1 to 9 mg equivalents/g, and ion exchange groups are distributed in the organic porous ion exchanger.

In the catalytic hydrogenation reduction method, preferably, an amount of support of at least one of the platinum group metal ions, the platinum group metal complex ions, and the platinum group metal nanoparticles is in the range of 0.01 to 10% by mass in terms of atoms of platinum group metals.

In the catalytic hydrogenation reduction method, preferably, catalytic hydrogenation reduction of the reaction substrate is performed by continuously feeding the reaction substrate and the hydrogen source to a reaction container filled with the platinum group metal-supported catalyst and thus continuously contacting the reaction substrate and the hydrogen source in the presence of the platinum group metal-supported catalyst.

Advantageous Effects of Invention

According to the present invention, there can be provided a catalytic hydrogenation reduction method capable of performing catalytic hydrogenation reduction reaction at a high conversion.

DESCRIPTION OF EMBODIMENTS

Figure 1:
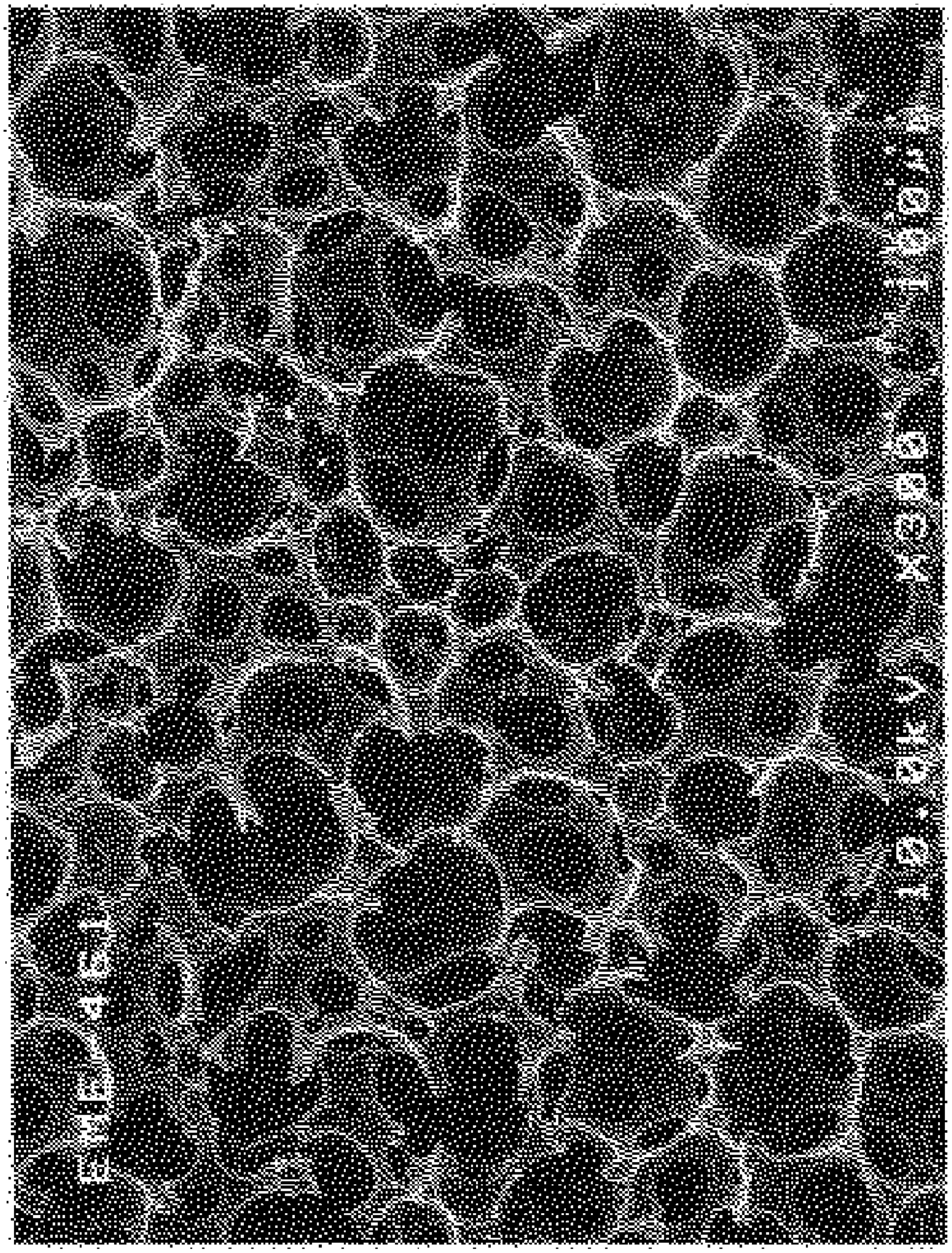
FIG. 1 An SEM photograph of a form example of a first monolith.

An embodiment of the present invention will be described below. The present embodiment is one example for carrying out the present invention, and the present invention is not limited to the present embodiment.

<Catalytic Hydrogenation Reduction Method>

A catalytic hydrogenation reduction method according to an embodiment of the present invention is a catalytic hydrogenation reduction method including contacting a reaction substrate and a hydrogen source in the presence of a platinum group metal-supported catalyst to perform catalytic hydrogenation reduction of the reaction substrate.

The platinum group metal-supported catalyst is a platinum group metal-supported catalyst where at least one of platinum group metal ions, platinum group metal complex ions, and platinum group metal nanoparticles having an average particle size in the range of 1 to 100 nm is supported on an ion exchanger, and the ion exchanger is a non-particulate weakly basic organic porous ion exchanger including a continuous skeleton phase and a continuous hole phase, in which a thickness of a continuous skeleton is in the range of 1 to 100 μm, an average diameter of continuous holes is in the range of 1 to 1000 μm, a total pore volume is in the range of 0.5 to 50 mL/g, an ion exchange capacity per weight in a dry state is in the range of 1 to 9 mg equivalents/g, and ion exchange groups are distributed in the ion exchanger.

Hereinafter, the "at least one of platinum group metal ions, platinum group metal complex ions, and platinum group metal nanoparticles having an average particle size in the range of 1 to 100 nm" is sometimes referred to as "platinum group metal or the like".

The present inventor has conducted intensive studies, and as a result, has found that catalytic hydrogenation reduction reaction can be performed at a high conversion by contacting a reaction substrate and a hydrogen source in the presence of a platinum group metal-supported catalyst where a platinum group metal or the like is supported on a non-particulate weakly basic organic porous ion exchanger. Since catalytic hydrogenation reduction reaction can be performed at a high conversion, the amount of use of a catalyst can be reduced as compared with the case of a low conversion, and the amount of use of a platinum group metal can be reduced. Furthermore, the platinum group metal-supported catalyst where the platinum group metal or the like is supported on the non-particulate weakly basic organic porous ion exchanger has a long catalyst lifetime.

[Non-Particulate Weakly Basic Organic Porous Ion Exchanger]

The carrier on which the platinum group metal or the like is supported, in the platinum group metal-supported catalyst used in the catalytic hydrogenation reduction method according to the present embodiment, is a non-particulate weakly basic organic porous ion exchanger. The non-particulate weakly basic organic porous ion exchanger is obtained by introducing a weakly basic ion exchange group into a monolithic organic porous body having a continuous skeleton phase and a continuous hole phase. The monolithic organic porous body has a large number of communication holes serving as flow paths, between skeletons. Herein, the "monolithic organic porous body" is also simply referred to as "monolith", the "weakly basic monolithic organic porous ion exchanger" is also simply referred to as "monolith ion exchanger" or "monolith anion exchanger", and the "monolithic organic porous intermediate" as an intermediate (precursor) in monolith production is also simply referred to as "monolith intermediate".

The structure of the non-particulate weakly basic organic porous ion exchanger is disclosed in JP 2002-306976 A, JP 2009-007550 A, JP 2009-062512 A, JP 2009-067982 A, and JP 2009-108294 A.

The non-particulate weakly basic organic porous ion exchanger includes a continuous skeleton phase and a continuous hole phase, the thickness of a continuous skeleton is in the range of 1 to 100 μm, the average diameter of continuous holes is in the range of 1 to 1000 μm, the total pore volume is in the range of 0.5 to 50 mL/g, the ion exchange capacity per weight in a dry state is in the range of 1 to 9 mg equivalents/g, and ion exchange groups are distributed in the organic porous ion exchanger. The continuous skeleton phase and the continuous hole phase are observed in an SEM image.

The thickness of the continuous skeleton in a dry state of the non-particulate weakly basic organic porous ion exchanger is in the range of 1 to 100 μm. The thickness of the continuous skeleton in a dry state of the non-particulate weakly basic organic porous ion exchanger is determined by SEM observation. If the thickness of the continuous skeleton is less than 1 μm, the non-particulate weakly basic organic porous ion exchanger may be deformed in the case of a reduction in ion exchange capacity per volume, or in the case of lowered mechanical strength and sending of a reaction liquid with a reaction container being filled with the platinum group metal-supported catalyst, in particular, in the case of liquid sending at a high flow velocity. If the thickness of the continuous skeleton is more than 100 μm, the skeleton may be so thick that the pressure loss during liquid sending is increased.

The average diameter of the continuous holes in a dry state of the non-particulate weakly basic organic porous ion exchanger is in the range of 1 to 1000 μm. The average diameter of the continuous holes in a dry state of the non-particulate weakly basic organic porous ion exchanger refers to the maximum value in a pore distribution curve measured by a mercury intrusion technique and obtained by a mercury intrusion technique. If the average diameter of the continuous holes is less than 1 μm, the pressure loss during liquid sending may be increased in the case of sending of a reaction liquid with a reaction container being filled with the platinum group metal-supported catalyst. If the average diameter of the continuous holes is more than 1000 μm, the contact between a reaction liquid and the monolith ion exchanger may be insufficient and the catalyst activity may be reduced, in the case of sending of a reaction liquid with a reaction container being filled with the platinum group metal-supported catalyst.

The total pore volume in a dry state of the non-particulate weakly basic organic porous ion exchanger is in the range of 0.5 to 50 mL/g. The total pore volume in a dry state of the non-particulate weakly basic organic porous ion exchanger is measured by a mercury intrusion technique. If the total pore volume is less than 0.5 mL/g, the pressure loss during liquid sending may be increased in the case of sending of a reaction liquid with a reaction container being filled with the platinum group metal-supported catalyst. If the total pore volume is more than 50 mL/g, mechanical strength of the non-particulate weakly basic organic porous ion exchanger may be lowered, the monolith ion exchanger may be deformed and the pressure loss during liquid sending may be increased, in the case of sending of a reaction liquid with a reaction container being filled with the platinum group metal-supported catalyst, in particular, in the case of liquid sending at a high flow velocity.

The ion exchange capacity per weight in a dry state of the non-particulate weakly basic organic porous ion exchanger is in the range of 1 to 9 mg equivalents/g. The ion exchange capacity per weight in a dry state of the non-particulate weakly basic organic porous ion exchanger is measured by a method such as neutralization titration or precipitation titration. If the ion exchange capacity is less than 1 mg equivalents/g, the amount of the platinum group metal ion or the platinum group metal complex ion which can be supported may be reduced. If the ion exchange capacity is more than 9 mg equivalents/g, ion exchange group introduction reaction may be under severe conditions and oxidative degradation of the monolith may remarkably progress.

Ion exchange groups introduced in the non-particulate weakly basic organic porous ion exchanger are preferably distributed, more preferably uniformly distributed not only in a monolith surface, but also in a monolith skeleton interior, namely, in the organic porous ion exchanger. The "ion exchange groups uniformly distributed in the organic porous ion exchanger" indicates that ion exchange groups are distributed at least in the nanometer order, in a surface and a skeleton interior of the organic porous ion exchanger. The distribution state of ion exchange groups is confirmed with an electron probe microanalyzer (EPMA). When ion exchange groups are distributed not only in a monolith surface, but also into a monolith skeleton interior, physical properties and chemical properties of the surface and the internal of the monolith can be almost uniform, resulting in enhancements in durability against swelling and shrinkage.

Such an ion exchange group introduced in the non-particulate weakly basic organic porous ion exchanger is a weakly basic anion exchange group. Examples of the weakly basic anion exchange group include tertiary amino groups such as a dimethylamino group, a diethylamino group, a dipropylamino group, a dibutylamino group, a methylhydroxyethylamino group, a methylhydroxypropylamino group, a dicyclohexylamino group, a pyrrolidyl group, a piperidyl group, a 2,2,6,6-tetramethylpiperidyl group, and a morpholyl group, secondary amino groups such as a methylamino group, an ethylamino group, a propylamino group, a butylamino group, a hydroxyethylamino group, and a hydroxy butylamino group, and primary amino groups.

The material constituting the continuous skeleton in the non-particulate weakly basic organic porous ion exchanger is an organic polymer material having a crosslinked structure. The organic polymer material preferably contains 0.1 to 30% by mol of a crosslinked structure unit, more preferably 0.1 to 20% by mol of a crosslinked structure unit, relative to all constituent units constituting the organic polymer material.

No particular limitation is imposed on the type of the organic polymer material, and examples thereof include respective crosslinked polymers of, for example, aromatic vinyl polymers such as polystyrene, poly(α-methylstyrene), polyvinyltoluene, polyvinylbenzyl chloride, polyvinylbiphenyl, and polyvinylnaphthalene: polyolefins such as polyethylene and polypropylene: poly(halogenated polyolefins) such as polyvinyl chloride and polytetrafluoroethylene: nitrile-based polymers such as polyacrylonitrile; and (meth) acrylic polymers such as polymethyl methacrylate, polyglycidyl methacrylate, and polyethyl acrylate. The organic polymer material may be a polymer obtained by copolymerization of a single vinyl monomer and a crosslinking agent or a polymer obtained by polymerization of a plurality of vinyl monomers and a crosslinking agent, or two or more polymers blended. Among these organic polymer materials, a preferable material is, for example, a crosslinked polymer of an aromatic vinyl polymer, in particular, a styrene-divinylbenzene-based copolymer or a vinylbenzyl chloride-divinylbenzene-based copolymer, from the viewpoints of, for example, easy continuous structure formation, easy ion exchange group introduction and high mechanical strength, and high stability against acid or alkali.

[First to Fifth Monolith Ion Exchangers]

Examples of more specific embodiments of the non-particulate weakly basic organic porous ion exchanger include the following first monolithic organic porous ion exchanger (monolith ion exchanger) to fifth monolithic organic porous ion exchanger (monolith ion exchanger). In the following description, the description of the same configuration as in the non-particulate weakly basic organic porous ion exchanger will be omitted.

(First Monolith Ion Exchanger)

The first monolith ion exchanger is a monolith ion exchanger which has a continuous macropore structure having macropores connected to each other and common openings (mesopores) having an average diameter in the range of 1 to 1000 μm in walls of the macropores, in which the total pore volume is in the range of 1 to 50 mL/g, the ion exchange capacity per weight in a dry state is in the range of 1 to 9 mg equivalents/g, and ion exchange groups are distributed in the organic porous ion exchanger.

The first monolith ion exchanger is a continuous macropore structure body having continuous macropores (pores), as illustrated in FIG. 1. The first monolith ion exchanger and the production method thereof are disclosed in JP 2002-306976 A.

The first monolith ion exchanger has macropores connected to each other and common openings (mesopores) located in walls of the macropores. The mesopores have overlapped portions where the macropores are overlapped. The average diameter in the mesopore-overlapped portions in a dry state is preferably in the range of 1 to 1000 μm, more preferably in the range of 10 to 200 μm, further preferably in the range of 20 to 200 μm. The average diameter of openings of the first monolith in a dry state refers to the maximum value in a pore distribution curve measured by a mercury intrusion technique and obtained by a mercury intrusion technique.

Most of the first monolith ion exchanger has an open pore structure where the inside of each void formed by the macropores and the mesopores serves as a flow path. If the average diameter in the mesopore-overlapped portions in a dry state is less than 1 μm, the pressure loss during liquid sending may be remarkably increased in the case of sending of a reaction liquid with a reaction container being filled with the platinum group metal-supported catalyst. If the average diameter in the mesopore-overlapped portions in a dry state is more than 1000 μm, the contact between a reaction liquid and the monolith ion exchanger may be insufficient and the catalyst activity may be reduced, in the case of sending of a reaction liquid with a reaction container being filled with the platinum group metal-supported catalyst. The number of portions where macropores and macropores are overlapped is, for example, 1 to 12, at most 3 to 10 per macropore. The first monolith ion exchanger corresponds to the above continuous macropore structure body, and thus a group of macropores and a group of common pores not only can be each formed almost uniformly, but also can be extremely large in pore volume and specific surface area as compared with a particle-aggregated porous body described in JP Hei8-252579 A.

The total pore volume per weight in a dry state of the first monolith ion exchanger is preferably in the range of 1 to 50 mL/g, more preferably in the range of 2 to 30 mL/g. If the total pore volume per weight in a dry state is less than 1 mL/g, the pressure loss during liquid sending may be increased and furthermore the amount of penetration per unit cross-section area may be reduced to lead to a reduction in treatment capacity, in the case of sending of a reaction liquid with a reaction container being filled with the platinum group metal-supported catalyst. If the total pore volume per weight in a dry state is more than 50 mL/g, the monolith ion exchanger may be deformed in the case of lowered mechanical strength and sending of a reaction liquid with a reaction container being filled with the platinum group metal-supported catalyst, in particular, in the case of liquid sending at a high flow velocity.

The ion exchange capacity per weight in a dry state is as described above. The "ion exchange groups distributed in the organic porous ion exchanger" are as described above.

(Method for Producing First Monolith Ion Exchanger)

The first monolith ion exchanger can be produced by, for example, the following method.

For example, first, an ion exchange group-free oil-soluble monomer, a surfactant, water, and, if necessary, a polymerization initiator can be mixed to obtain a water-in-oil type emulsion. Next, the water-in-oil type emulsion can be subjected to polymerization, to form a first monolith.

The ion exchange group-free oil-soluble monomer used in production of the first monolith refers to an ion exchange group-free, low water-soluble, and lipophilic monomer. The monomer is, for example, styrene, α-methylstyrene, vinylbenzyl chloride, ethylene, propylene, vinyl chloride, vinyl bromide, acrylonitrile, methacrylonitrile, vinyl acrylate, methyl acrylate, ethyl acrylate, 2-ethylhexyl acrylate, butanediol diacrylate, methyl methacrylate, ethyl methacrylate, 2-ethylhexyl methacrylate, or ethylene glycol dimethacrylate. These monomers can be used singly or in combinations of two or more kinds thereof. Herein, preferably, a crosslinkable monomer such as divinylbenzene or ethylene glycol dimethacrylate is selected as at least one component of the oil-soluble monomer and the content of the crosslinkable monomer is, for example, in the range of 0.3 to 10% by mol, suitably in the range of 0.3 to 5% by mol in the entire oil-soluble monomer, because ion exchange groups can be quantitatively introduced in a subsequent step and practically sufficient mechanical strength can be ensured.

The surfactant used in production of the first monolith may be any surfactant so long as such any surfactant can form a water-in-oil type (W/O) emulsion in mixing of the ion exchange group-free oil-soluble monomer and water, and is not particularly limited. Examples of the surfactant include nonionic surfactants such as sorbitan monooleate, sorbitan monolaurate, and polyoxyethylene nonyl phenyl ether: anionic surfactants such as potassium oleate, sodium dodecylbenzenesulfonate, and sodium dioctylsulfosuccinate; cationic surfactants such as distearyl dimethyl ammonium chloride; and zwitterionic surfactants such as lauryl dimethyl betaine. These surfactants can be used singly or in combinations of two or more kinds thereof. The water-in-oil type emulsion refers to an emulsion where an oil phase is a continuous phase and water droplets are dispersed therein. The amount of addition of the surfactant may be, for example, in the range of about 2 to 70% based on the total amount of the oil-soluble monomer and the surfactant. In order to control the bubble shape and the size of the monolith, for example, alcohol such as methanol or stearyl alcohol: carboxylic acid such as stearic acid: hydrocarbon such as octane, dodecane, or toluene: or cyclic ether such as tetrahydrofuran or dioxane can also co-exist in the system.

When the monolith is formed by polymerization in production of the first monolith, the polymerization initiator, if necessary, used is suitably a compound which generates a radical by heat and light irradiation. The polymerization initiator may be water-soluble or oil-soluble, and is, for example, azobisisobutyronitrile, azobisdimethylvaleronitrile, azobiscyclohexanenitrile, azobiscyclohexanecarbonitrile, benzoyl peroxide, potassium persulfate, ammonium persulfate, hydrogen peroxide-ferrous chloride, sodium persulfate-acidic sodium sulfite, or tetramethyl thiuram disulfide. Herein, a system is also optionally adopted where polymerization progresses only by heating or only by light irradiation without addition of any polymerization initiator, and thus it may be the case that no polymerization initiator is added in such a system.

Various conditions can be selected as conditions of polymerization of the water-in-oil type emulsion in production of the first monolith, depending on the type of the monomer, the system of the initiator, and/or the like. When the polymerization initiator here used is, for example, azobisisobutyronitrile, benzoyl peroxide, or potassium persulfate, for example, heating polymerization may be performed in, for example, a hermetically sealed container under an inert atmosphere, for example, at 30 to 100° C. for 1 to 48 hours. When hydrogen peroxide-ferrous chloride, sodium persulfate-acidic sodium sulfite, or the like is used as the polymerization initiator, polymerization may be performed in, for example, a hermetically sealed container under an inert atmosphere, for example, at 0 to 30° C. for 1 to 48 hours. After termination of the polymerization, the content can be taken out and subjected to soxhlet extraction with a solvent such as isopropanol, to remove the unreacted monomer and the remaining surfactant and then obtain the first monolith.

Examples of the method for ion exchange group introduction into the first monolith include the following methods (1) and (2). (1) An ion exchange group-containing monomer, for example, a monomer where an ion exchange group is introduced into the ion exchange group-free oil-soluble monomer, can be used instead of an ion exchange group-free monomer, and subjected to polymerization and then formed into a monolith ion exchanger in one stage. (2) The first monolith can be formed by polymerization with an ion exchange group-free monomer, and then ion exchange groups can be introduced.

No particular limitation is imposed on the method for ion exchange group introduction into the first monolith, and a known method such as polymer reaction or graft polymerization can be used. Examples of the method for amine group introduction include an introduction method involving introducing a chloromethyl group by chloromethyl methyl ether and then reacting the resultant with a desired secondary amine, in the case of a monolith which is a styrene-divinylbenzene copolymer or the like: an introduction method involving producing a monolith by copolymerization of chloromethylstyrene and divinylbenzene, and reacting the resultant with a desired secondary amine; and an introduction method involving introducing a radical initiation group or a chain transfer group, performing graft polymerization by glycidyl methacrylate, and then reacting the resultant with a desired secondary amine.

(Second Monolith Ion Exchanger)

The second monolith ion exchanger is a monolith ion exchanger which has a three-dimensionally continued skeleton portion formed by aggregation of organic polymer particles having an average particle size in the range of 1 to 50 μm, and between such skeletons has three-dimensionally continuous holes having an average diameter in the range of 20 to 100 μm, in which the total pore volume is in the range of 1 to 10 mL/g, the ion exchange capacity per weight in a dry state is in the range of 1 to 9 mg equivalents/g, and ion exchange groups are distributed in the organic porous ion exchanger.

Figure 2:
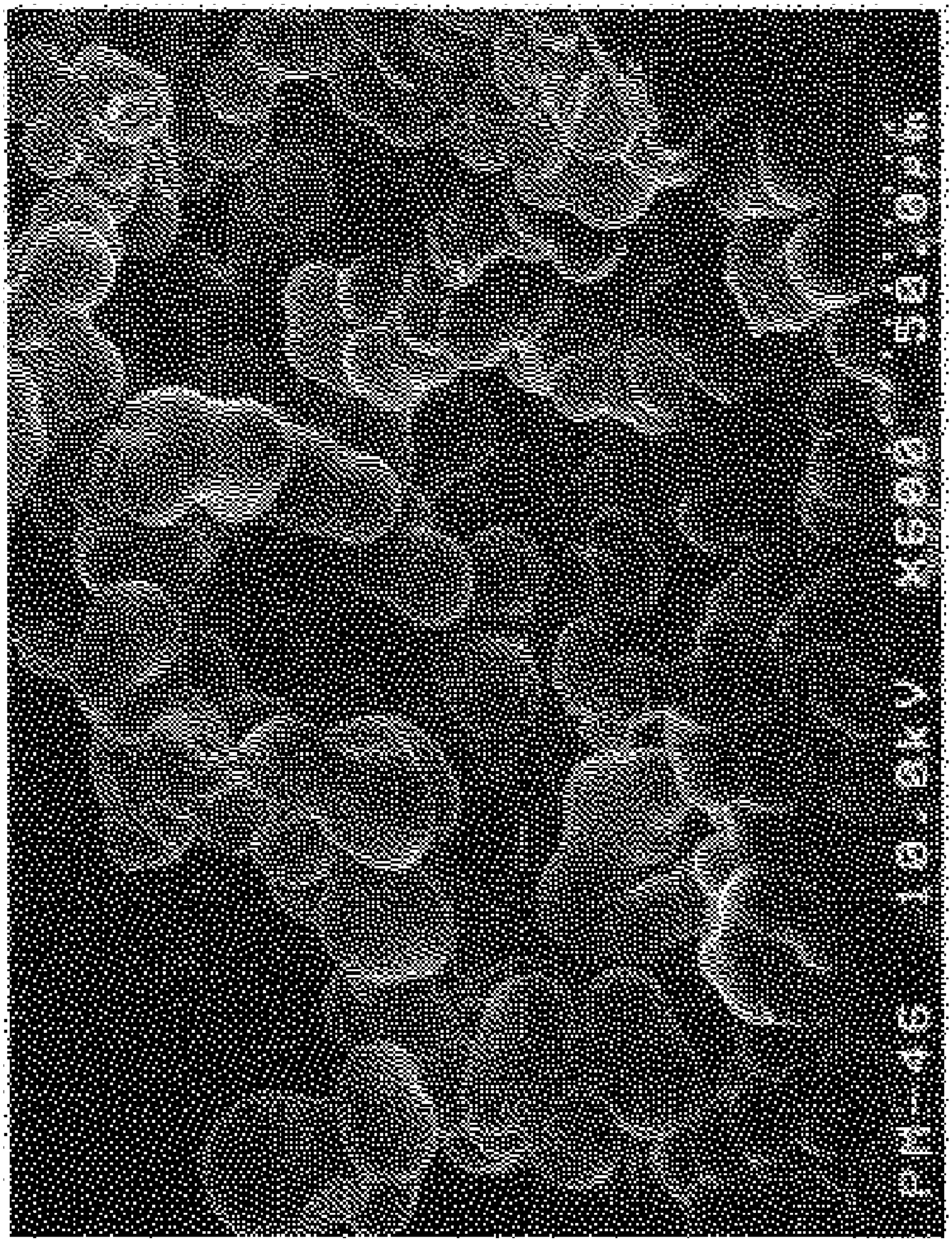
FIG. 2 An SEM photograph of a form example of a second monolith.

The second monolith ion exchanger is a particle-aggregated structure body obtained by aggregation of particles, as illustrated in FIG. 2. The second monolith ion exchanger and the production method thereof are disclosed in JP 2009-007550 A.

The second monolith ion exchanger has a three-dimensionally continued skeleton portion obtained by aggregation of organic polymer particles having a crosslinked structure unit and having an average particle size in a dry state preferably in the range of 1 to 50 μm, more preferably in the range of 1 to 30 μm. Between such continuous skeletons the second monolith ion exchanger has three-dimensionally continued holes (continuous holes), having an average diameter in a dry state preferably in the range of 20 to 100 μm, more preferably in the range of 20 to 90 μm. An SEM photograph of a part arbitrarily extracted of a cross section of the second monolith ion exchanger in a dry state is taken, the diameters of organic polymer particles in all particles in the SEM photograph are measured, and the average value is defined as the average particle size. The average diameter of continuous holes in a dry state is determined by a mercury intrusion technique, as in the case of the first monolith ion exchanger.

If the average particle size of organic polymer particles is less than 1 μm in a dry state, the average diameter of continuous holes between skeletons may be as small as less than 20 μm in a dry state. If the average particle size of organic polymer particles is more than 50 μm, the pressure loss may be increased in the case of sending of a reaction liquid with a reaction container being filled with the platinum group metal-supported catalyst. If the average diameter of continuous holes is less than 20 μm in a dry state, the pressure loss in penetration of a reaction liquid may be increased in the case of sending of a reaction liquid with a reaction container being filled with the platinum group metal-supported catalyst. If the average diameter of continuous holes is more than 100 μm in a dry state, the contact between a reaction liquid and the monolith ion exchanger may be insufficient in the case of sending of a reaction liquid with a reaction container being filled with the platinum group metal-supported catalyst.

The total pore volume per weight in a dry state of the second monolith ion exchanger is preferably in the range of 1 to 10 mL/g. If the total pore volume is less than 1 mL/g, the pressure loss during liquid sending may be increased and furthermore the amount of penetration per unit cross-section area may be reduced to lead to a reduction in treatment capacity, in the case of sending of a reaction liquid with a reaction container being filled with the platinum group metal-supported catalyst. If the total pore volume is more than 10 mL/g, the monolith ion exchanger may be deformed in the case of lowered mechanical strength and sending of a reaction liquid with a reaction container being filled with the platinum group metal-supported catalyst, in particular, in the case of liquid sending at a high flow velocity.

The ion exchange capacity per weight in a dry state is as described above. The "ion exchange groups distributed in the organic porous ion exchanger" is as described above.

(Method for Producing Second Monolith Ion Exchanger)

The second monolith ion exchanger can be produced by, for example, the following method.

For example, a vinyl monomer, a specified amount of a crosslinking agent, an organic solvent, and a polymerization initiator can be mixed and subjected to polymerization in a still standing state, to obtain a second monolith.

The vinyl monomer used in production of the second monolith is the same as the monomer used in production of the first monolith.

The crosslinking agent used in production of the second monolith is preferably one containing at least two polymerizable vinyl groups in a molecule and having high solubility in the organic solvent. The crosslinking agent is, for example, divinylbenzene, divinylbiphenyl, or ethylene glycol dimethacrylate. These crosslinking agents can be used singly or in combinations of two or more kinds thereof. A preferred crosslinking agent is an aromatic polyvinyl compound such as divinylbenzene, divinylnaphthalene, or divinylbiphenyl, from the viewpoints of high mechanical strength, stability against hydrolysis, and the like. The amount of use of the crosslinking agent relative to the total amount of the vinyl monomer and the crosslinking agent ({crosslinking agent/(vinyl monomer+crosslinking agent)}×100) is, for example, in the range of 1 to 5% by mol, preferably in the range of 1 to 4% by mol.

The organic solvent used in production of the second monolith is an organic solvent which, while dissolving the vinyl monomer and the crosslinking agent, dissolves almost none of a polymer produced by polymerization of the vinyl monomer; in other words, a poor solvent to a polymer produced by polymerization of the vinyl monomer. When the vinyl monomer is, for example, styrene, examples of the organic solvent include alcohols such as methanol, butanol, and octanol; linear ethers such as diethyl ether and ethylene glycol dimethyl ether; and linear saturated hydrocarbons such as hexane, octane, and decane.

The polymerization initiator used in production of the second monolith is preferably a compound which generates a radical by heat and light irradiation. The polymerization initiator is preferably oil-soluble. The polymerization initiator is, for example, 2,2'-azobis(isobutyronitrile), 2,2'-azobis(2,4-dimethylvaleronitrile), 2,2'-azobis(2-methylbutyronitrile), 2,2'-azobis(4-methoxy-2,4-dimethylvaleronitrile), dimethyl 2,2'-azobisisobutyrate, 4,4'-azobis(4-cyanovaleric acid), 1,1'-azobis(cyclohexane-1-carbonitrile), benzoyl peroxide, lauroyl peroxide, potassium persulfate, ammonium persulfate, or tetramethyl thiuram disulfide. The amount of use of the polymerization initiator relative to the total amount of the vinyl monomer and the crosslinking agent ({polymerization initiator/(vinyl monomer+crosslinking agent)}×100) is, for example, in the range of about 0.01 to 5% by mol.

When 2,2'-azobis(isobutyronitrile), 2,2'-azobis(2,4-dimethylvaleronitrile), benzoyl peroxide, lauroyl peroxide, potassium persulfate, or the like is used as the polymerization initiator in production of the second monolith, heating polymerization may be performed in, for example, a hermetically sealed container under an inert atmosphere, for example, at 30 to 100° C. for 1 to 48 hours. After termination of the polymerization, the content can be taken out and extracted with a solvent such as acetone for removal of the unreacted vinyl monomer and the organic solvent, to obtain the second monolith.

Adjustment of polymerization conditions in production of the second monolith, for example, an increase of the crosslinking agent, an increase in monomer concentration, a temperature rise, and/or the like, can allow for aggregation of organic polymer particles having an average particle size of 1 to 50 μm. The amount of use of the crosslinking agent based on the total amount of the vinyl monomer and the crosslinking agent can be any specified amount, and thus three-dimensionally continued holes having an average diameter of 20 to 100 μm can be formed between skeletons. Polymerization can be performed under a condition so that the amount of use of the organic solvent based on the total amount of use of the organic solvent, the monomer, and the crosslinking agent ({organic solvent/(organic solvent+monomer+crosslinking agent)}×100) is, for example, approximately in the range of 30 to 80% by weight, suitably in the range of 40 to 70% by weight, and thus the total pore volume of monolith can be 1 to 5 mL/g. The method for ion exchange group introduction into the second monolith is the same as the method for ion exchange group introduction into the first monolith.

(Third Monolith Ion Exchanger)

A third monolith ion exchanger is a monolith ion exchanger which is a continuous macropore structure body where bubble-like macropores are overlapped and such overlapped portions serve as openings having an average diameter in the range of 30 to 300 μm, in which the total pore volume is in the range of 0.5 to 10 mL/g, the ion exchange capacity per weight in a dry state is in the range of 1 to 9 mg equivalents/g, ion exchange groups are distributed in the organic porous ion exchanger, and the skeleton portion area appearing in a cross section in an SEM image of a cut surface of the continuous macropore structure body is in the range of 25 to 50% in an image region.

Figure 3:
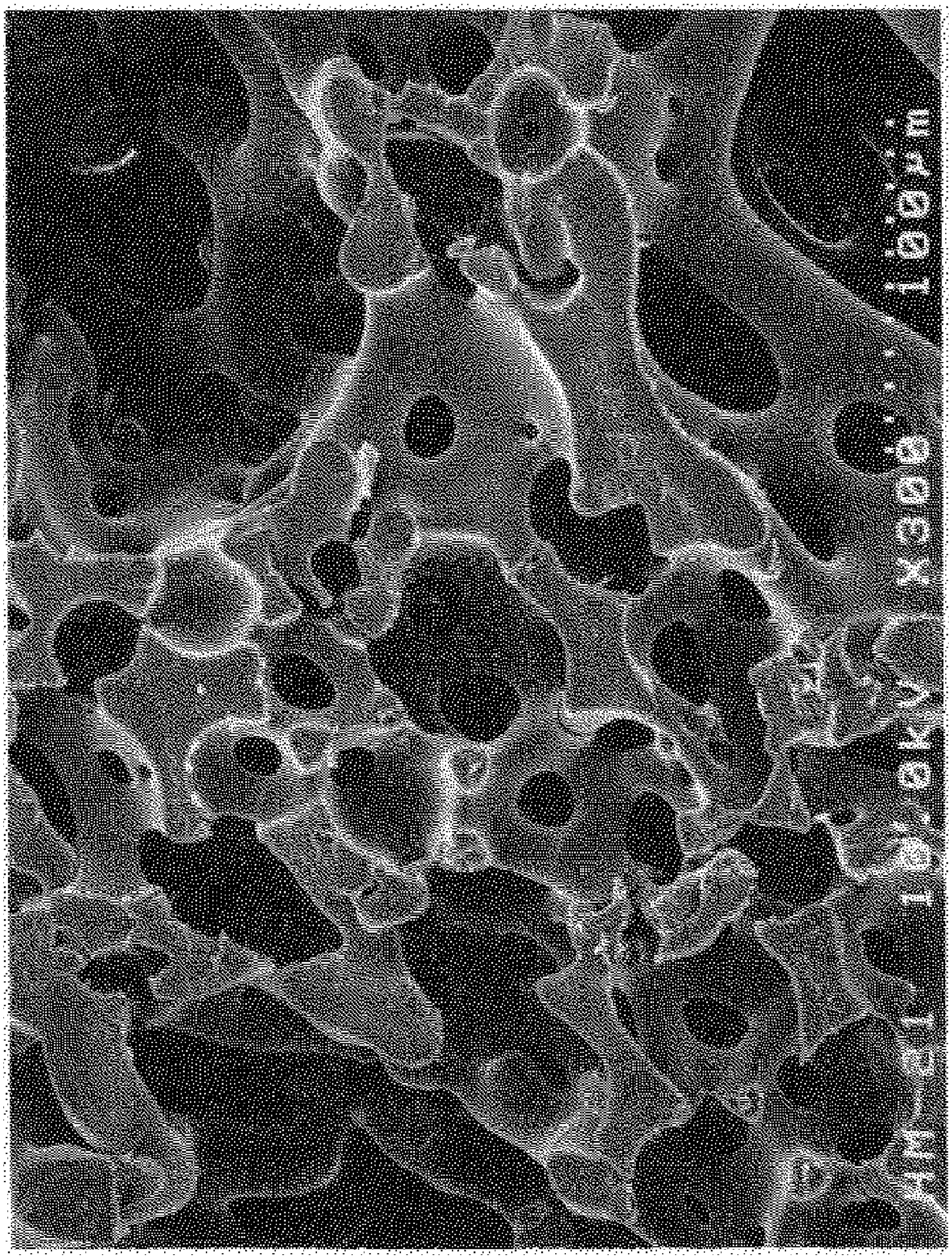
FIG. 3 An SEM photograph of a form example of a third monolith.

The third monolith ion exchanger is a continuous macropore structure body as in the first monolith ion exchanger, as illustrated in FIG. 3. The third monolith ion exchanger and the production method thereof are disclosed in JP 2009-062512 A.

The continuous holes have overlapped portions where macropores are overlapped. The average diameter in the overlapped portions in a dry state is preferably in the range of 30 to 300 μm, more preferably in the range of 30 to 200 μm, further preferably in the range of 40 to 100 μm. The average diameter refers to the maximum value in a pore distribution curve measured by a mercury intrusion technique and obtained by a mercury intrusion technique. If the average diameter of openings in a dry state is less than 30

μm, the pressure loss during liquid sending may be increased in the case of sending of a reaction liquid with a reaction container being filled with the platinum group metal-supported catalyst, and if the average diameter is more than 300 μm, the contact between a reaction liquid and the monolith ion exchanger may be insufficient.

The skeleton portion area appearing in a cross section in an SEM image of a cut surface of the continuous macropore structure body in a dry state in the third monolith ion exchanger is, for example, in the range of 25 to 50%, preferably in the range of 25 to 45% in an image region. If the skeleton portion area appearing in the cross section is less than 25% in an image region, the skeleton may be fine, and the monolith ion exchanger may be deformed in the case of lowered mechanical strength and sending of a reaction liquid with a reaction container being filled with the platinum group metal-supported catalyst. If the skeleton portion area appearing in the cross section is more than 50% in an image region, the skeleton may be so thick that the pressure loss during liquid sending is increased in the case of sending of a reaction liquid with a reaction container being filled with the platinum group metal-supported catalyst.

Figure 4:
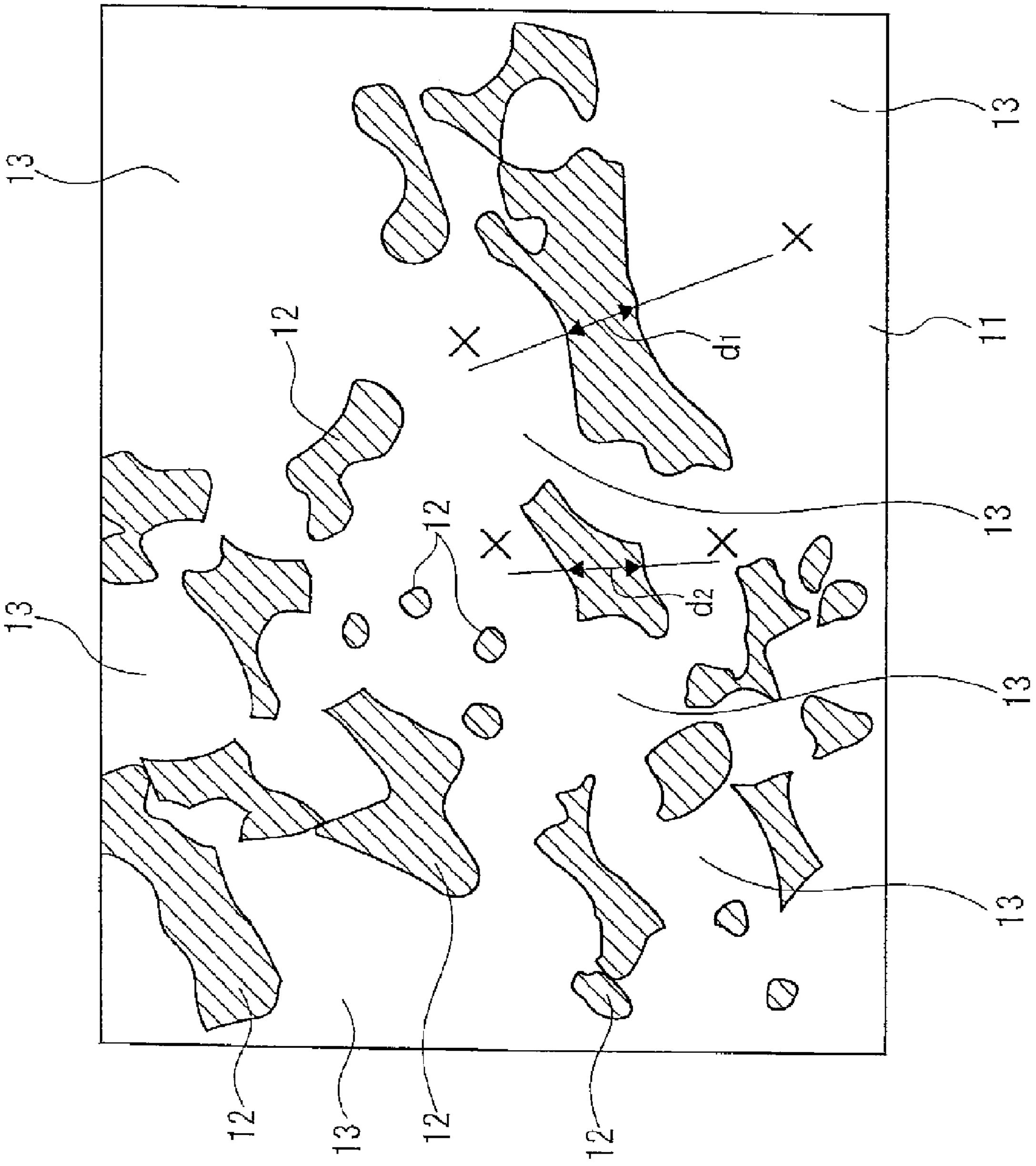
FIG. 4 A view obtained by transferring a skeleton portion appearing as a cross section in the SEM photograph of FIG. 3.

Conditions for obtaining the SEM image may be conditions so that the skeleton portion appearing in the cross section of the cut surface clearly appears, and, for example, the magnification is 100 to 600 and the photograph region is about 150 mm×100 mm. SEM observation may be performed with three or more images which are taken at any positions in any cut surface of the third monolith ion exchanger with any subjective view being eliminated and which differ in cutting positions and imaging positions. The third monolith ion exchanger to be cut is in a dry state. A skeleton portion in the cut surface in the SEM image will be described with reference to FIG. 3 and FIG. 4. In FIG. 3 and FIG. 4, one having a substantially irregular shape and appearing in the cross section corresponds to a "skeleton portion (reference numeral 12) appearing in the cross section", a round hole appearing in FIG. 3 is an opening (mesopore), and one having a relatively large curvature or curve corresponds to a macropore (reference numeral 13 in FIG. 4). The skeleton portion area appearing in the cross section in FIG. 4 occupies 28% in a rectangular image region 11.

The method for measuring the skeleton portion area appearing in the cross section of the cut surface in the SEM image is, for example, a calculation method involving identifying the skeleton portion by known computer processing or the like and then performing automatic calculation or manual calculation with a computer or the like. Such manual calculation is, for example, a method involving replacing an irregular-shaped article with a collected article of, for example, a quadrangle, triangle, circle, or trapezium, and stacking them to thereby determine the area.

The total pore volume per weight in a dry state of the third monolith ion exchanger is preferably in the range of 0.5 to 10 mL/g, more preferably in the range of 0.8 to 8 mL/g. If the total pore volume is less than 0.5 mL/g, the pressure loss during liquid sending may be increased and furthermore the amount of penetration of a fluid per unit cross-section area may be reduced to lead to a reduction in treatment capacity, in the case of sending of a reaction liquid with a reaction container being filled with the platinum group metal-supported catalyst. If the total pore volume is more than 10 mL/g, the monolith ion exchanger may be deformed in the case of lowered mechanical strength and sending of a reaction liquid with a reaction container being filled with the platinum group metal-supported catalyst, in particular, in the case of liquid sending at a high flow velocity. Furthermore, the contact efficiency between a reaction liquid and the monolith ion exchanger may be reduced.

The ion exchange capacity per weight in a dry state is as described above. The "ion exchange groups distributed in the organic porous ion exchanger" is as described above.

(Method for Producing Third Monolith Ion Exchanger)

The third monolith ion exchanger can be produced by, for example, the following method.

For example, first, a mixture of an ion exchange group-free oil-soluble monomer, a surfactant, and water is stirred, to thereby prepare a water-in-oil type emulsion. Next, the following step I, step II, and step III can be performed to thereby obtain the third monolith. In step I, for example, the water-in-oil type emulsion can be subjected to polymerization to obtain a monolithic organic porous intermediate (hereinafter, also designated as "monolith intermediate (3)") having a continuous macropore structure where the total pore volume is, for example, in the range of 5 to 16 mL/g. In step II, a mixture is prepared which contains a vinyl monomer, a crosslinking agent having two or more vinyl groups in one molecule, an organic solvent which, while dissolving the vinyl monomer and the crosslinking agent, does not dissolve any polymer produced by polymerization of the vinyl monomer, and a polymerization initiator. In step III, the mixture obtained in step II can be subjected to polymerization with being left to still stand in the presence of the monolith intermediate (3) obtained in step I, to thereby obtain a third monolith having a skeleton thicker than the skeleton of the monolith intermediate (3).

Step I is the same as in the method for producing the first monolith ion exchanger.

The monolith intermediate (3) obtained in step I has a continuous macropore structure. This can co-exist in the polymerization system, thereby forming a porous structure having a big-boned skeleton, with, as a mold, the structure of the monolith intermediate (3). The crosslinking density of a polymer material is preferably such that a crosslinked structure unit is contained, for example, in the range of 0.3 to 10% by mol, preferably in the range of 0.3 to 5% by mol, in all constituent units constituting the polymer material of the monolith intermediate (3).

The total pore volume per weight in a dry state of the monolith intermediate (3) obtained in step I is, for example, in the range of 5 to 16 mL/g, suitably in the range of 6 to 16 mL/g. In order that the total pore volume of the monolith intermediate (3) is within the numerical value range, the ratio between the monomer and water may be, for example, in the range of approximately 1:5 to 1:20.

The average diameter of openings (mesopores) serving as overlapped portions of macropores and macropores in the monolith intermediate (3) obtained in step I is, for example, in the range of 20 to 200 μm in a dry state.

Step II is a step of preparing a mixture containing a vinyl monomer, a crosslinking agent having two or more vinyl groups in one molecule, an organic solvent which, while dissolving the vinyl monomer and the crosslinking agent, does not dissolve any polymer produced by polymerization of the vinyl monomer, and a polymerization initiator. Herein, step I and step II may be performed in either order.

The vinyl monomer used in step II may be a lipophilic vinyl monomer containing a polymerizable vinyl group in a molecule and having high solubility in the organic solvent, and a vinyl monomer is preferably selected which allows for production of the same or similar polymer material as or to that of the monolith intermediate (3) co-existing in the polymerization system. Specific examples of the vinyl monomer are the same as those of the vinyl monomer used in production of the first monolith.

The amount of addition of the vinyl monomer used in step II is, for example, in the range of 3 to 50 times, preferably in the range of 4 to 40 times that of the monolith intermediate (3) co-existing in polymerization, on a weight basis.

The crosslinking agent used in step II is the same as the crosslinking agent used in production of the second monolith.

The organic solvent used in step II is the same as the organic solvent used in production of the second monolith. The amount of use of the organic solvent is preferably such that the concentration of the vinyl monomer is, for example, 30 to 80% by weight.

The polymerization initiator used in step II is the same as the polymerization initiator used in production of the second monolith.

In step III, for example, the mixture obtained in step II can be subjected to polymerization with being left to still stand in the presence of the monolith intermediate (3) obtained in step I, to thereby obtain a third monolith having a skeleton thicker than the skeleton in the monolith intermediate (3). The monolith intermediate (3), which has a continuous macropore structure, can be present in the polymerization system, to thereby obtain the third monolith.

In step III, for example, the monolith intermediate (3) is placed in the state of being impregnated with the mixture (solution), in a reaction container. The mixture obtained in step II and the monolith intermediate (3) may be compounded at a ratio so that the amount of addition of the vinyl monomer is, for example, in the range of 3 to 50 times, preferably in the range of 4 to 40 times that of the monolith intermediate (3), on a weight basis. The vinyl monomer and the crosslinking agent in the mixture in the reaction container are allowed to adsorb to and are dispensed in the skeleton of the monolith intermediate left still standing, and polymerization progresses in the skeleton of the monolith intermediate (3).

Various conditions can be selected as polymerization conditions of polymerization in step III, depending on the type of the monomer, the type of polymerization initiator, and/or the like. When, for example, 2,2'-azobis(isobutyronitrile), 2,2'-azobis(2,4-dimethylvaleronitrile), benzoyl peroxide, lauroyl peroxide, or potassium persulfate is used as the polymerization initiator, heating polymerization may be performed in, for example, a hermetically sealed container under an inert atmosphere, for example, at 30 to 100° C. for 1 to 48 hours. The vinyl monomer and the crosslinking agent adsorbing to and dispensed in the skeleton of the monolith intermediate (3) can be polymerized by heating polymerization in the skeleton to thicken the skeleton. After termination of the polymerization, the content can be taken out and extracted with a solvent such as acetone for removal of the unreacted vinyl monomer and the organic solvent, to obtain the third monolith.

The third monolith ion exchanger can be obtained by, for example, performing step IV of ion exchange group introduction into the third monolith obtained in step III. The method for ion exchange group introduction into the third monolith is the same as the method for ion exchange group introduction into the first monolith.

(Fourth Monolith Ion Exchanger)

A fourth monolith ion exchanger is a monolith ion exchanger which is a co-continuous structure body including a three-dimensionally continued skeleton configured from an aromatic vinyl polymer containing a crosslinked structure unit in the range of 0.1 to 5.0% by mol in all constituent units with ion exchange groups introduced, and having a thickness of a continuous skeleton, in the range of 1 to 60 μm, and, between such skeletons, three-dimensionally continued holes having an average diameter in the range of 10 to 200 μm, in which the total pore volume is in the range of 0.5 to 10 mL/g, the ion exchange capacity per weight in a dry state is in the range of 1 to 9 mg equivalents/g, and ion exchange groups are distributed in the organic porous ion exchanger.

Figure 5:
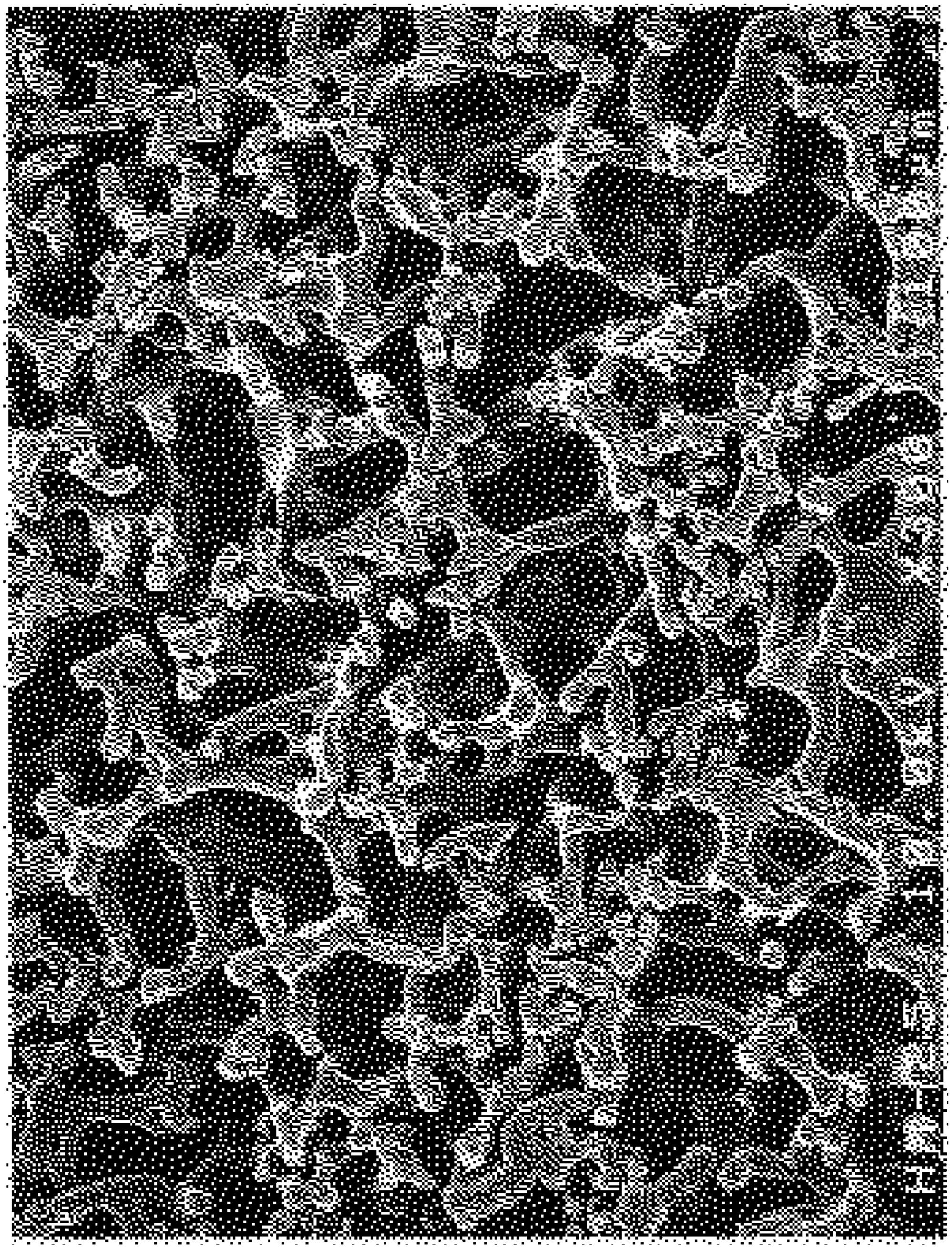
FIG. 5 An SEM photograph of a form example of a fourth monolith.
Figure 6:
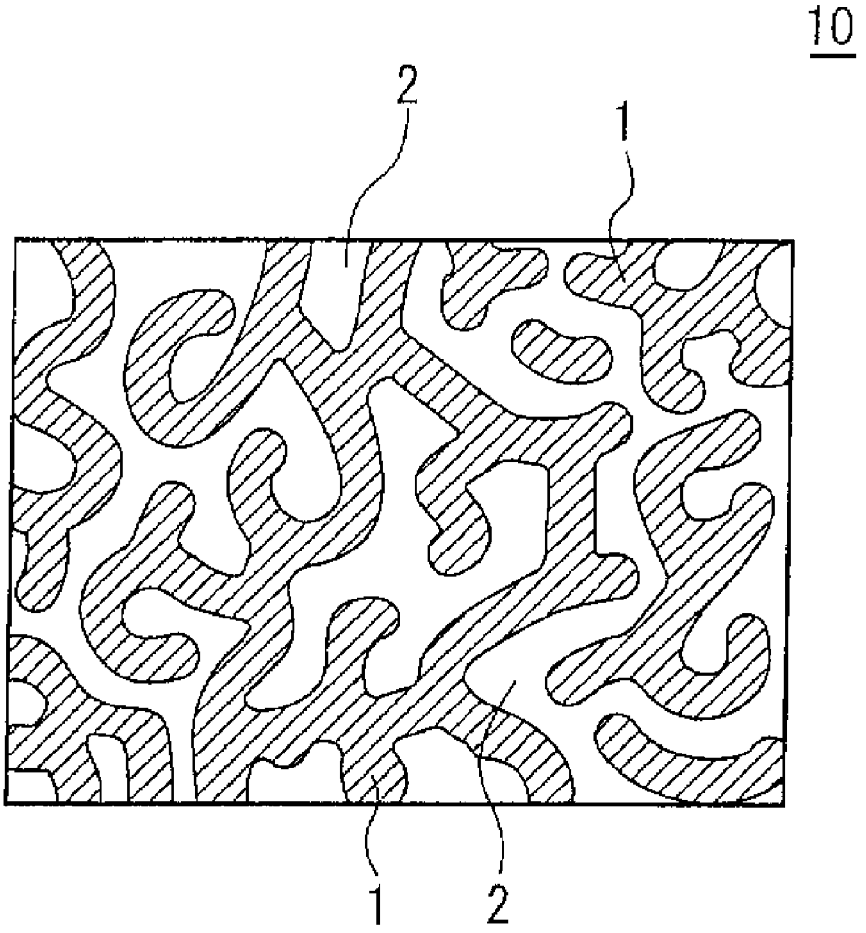
FIG. 6 A schematic view of a co-continuous structure of the fourth monolith and a monolith ion exchanger.

The fourth monolith ion exchanger is a co-continuous structure body 10 which has a continuous skeleton phase 1 (continuous skeletons) and a continuous hole phase 2 (continuous holes) and in which these phases are entangled and three-dimensionally continued together, as illustrated in FIG. 5 and FIG. 6. The hole phase 2 is here higher in continuousness as compared with those of the first and second monoliths, and is almost not biased in terms of size thereof. It is considered that the fourth monolith ion exchanger has a thick skeleton and thus has high mechanical strength. The fourth monolith ion exchanger and the production method thereof are disclosed in JP 2009-067982 A. Such a continuous skeleton is configured from a vinyl polymer (aromatic vinyl polymer or the like) containing a crosslinked structure unit in the range of 0.1 to 5.0% by mol in all constituent units with ion exchange groups introduced, and is three-dimensionally continued when the thickness of the continuous skeleton is, for example, in the range of 1 to 60 μm, preferably in the range of 3 to 58 μm in a dry state. If the content of the crosslinked structure unit is less than 0.1% by mol, mechanical strength may be insufficient, and if the content is more than 5.0% by mol, a structure of a porous body may easily depart from a co-continuous structure. If the thickness of the continuous skeleton is less than 1 μm in a dry state, the monolith ion exchanger may be deformed in the case of sending of a reaction liquid with a reaction container being filled with the platinum group metal-supported catalyst, in particular, in the case of liquid sending at a high flow velocity. If the thickness of the continuous skeleton is more than 60 μm in a dry state, an excessively thick skeleton may be obtained, and the pressure loss during liquid sending may be increased in the case of sending of a reaction liquid with a reaction container being filled with the platinum group metal-supported catalyst.

The continuous holes have an average diameter, for example, in the range of 10 to 200 μm, preferably in the range of 15 to 180 μm and are three-dimensionally continued in a dry state between continuous skeletons. If the average diameter of the continuous holes is less than 10 μm in a dry state, the pressure loss during liquid sending may be increased in the case of sending of a reaction liquid with a reaction container being filled with the platinum group metal-supported catalyst. If the average diameter is more than 200 μm, the contact between a reaction liquid and the monolith ion exchanger may be insufficient in the case of sending of a reaction liquid with a reaction container being filled with the platinum group metal-supported catalyst.

The average diameter refers to the maximum value in a pore distribution curve measured by a mercury intrusion technique and obtained by a mercury intrusion technique. The thickness of the continuous skeleton in a dry state is determined by SEM observation of the fourth monolith ion exchanger in a dry state. Specifically, SEM observation of the fourth monolith ion exchanger in a dry state is performed at least three times, the thickness of each skeleton in an image obtained is measured, and the average value thereof is defined as the thickness of the continuous skeleton. Herein, such a skeleton has a rod shape and a round cross section shape, and one having a cross section having different diameters, such as one having an elliptic cross section shape, may also be contained. The thickness in this case corresponds to the average of the shorter diameter and the longer size diameter.

The total pore volume per weight in a dry state of the fourth monolith ion exchanger is, for example, in the range of 0.5 to 10 mL/g. If the total pore volume is less than 0.5 mL/g, the pressure loss during liquid sending may be increased, and furthermore the amount of penetration of a fluid per unit cross-section area may be reduced to lead to a reduction in treatment capacity, in the case of sending of a reaction liquid with a reaction container being filled with the platinum group metal-supported catalyst. If the total pore volume is more than 10 mL/g, the monolith ion exchanger may be deformed in the case of lowered mechanical strength and sending of a reaction liquid with a reaction container being filled with the platinum group metal-supported catalyst, in particular, in the case of liquid sending at a high flow velocity. Furthermore, the contact efficiency between a reaction liquid and the monolith ion exchanger may be reduced.

Examples of the vinyl polymer (aromatic vinyl polymer) constituting the continuous skeleton include polystyrene, poly(α-methylstyrene), and polyvinylbenzyl chloride. The polymer may be a polymer obtained by copolymerization of a single vinyl monomer and a crosslinking agent or a polymer obtained by polymerization of a plurality of vinyl monomers and a crosslinking agent, or two or more polymers blended. Among these organic polymer materials, a styrene-divinylbenzene-based copolymer or a vinylbenzyl chloride-divinylbenzene-based copolymer is preferable, from the viewpoints of, for example, easy co-continuous structure formation, easy ion exchange group introduction and high mechanical strength, and high stability against acid or alkali.

The ion exchange capacity per weight in a dry state is as described above. The "ion exchange groups distributed in the organic porous ion exchanger" is as described above.

(Method for Producing Fourth Monolith Ion Exchanger)

The fourth monolith ion exchanger can be produced by, for example, the following method.

The fourth monolith can be obtained by, for example, preparing a water-in-oil type emulsion and then performing the following steps I to III. In step I, for example, the water-in-oil type emulsion can be subjected to polymerization to obtain a monolithic organic porous intermediate (hereinafter, monolith intermediate (4)) having a continuous macropore structure where the total pore volume is, for example, more than 16 mL/g and 30 mL/g or less. In step II, for example, a mixture is prepared which contains an aromatic vinyl monomer, a crosslinking agent having at least two or more vinyl groups in one molecule, in the range of, for example, 0.3 to 5% by mol in the entire oil-soluble monomer, an organic solvent which, while dissolving the aromatic vinyl monomer and the crosslinking agent, does not dissolve any polymer produced by polymerization of the aromatic vinyl monomer, and a polymerization initiator. In step III, for example, the mixture obtained in step II can be subjected to polymerization with being left to still stand in the presence of the monolith intermediate (4) obtained in step I, to thereby obtain the fourth monolith.

Step I in the method for producing the fourth monolith is the same as in the method for producing the first monolith ion exchanger.

The monolith intermediate (4) obtained in step I is, for example, an organic polymer material having a crosslinked structure, suitably an aromatic vinyl polymer. The crosslinking density of this polymer material is such that a crosslinked structure unit is contained, for example, in the range of 0.1 to 5% by mol, preferably in the range of 0.3 to 3% by mol, in all constituent units constituting the polymer material.

The type of the polymer material of the monolith intermediate (4) is the same as the type of the polymer material of the monolith intermediate (3) in the method for producing the third monolith.

Figure 7:
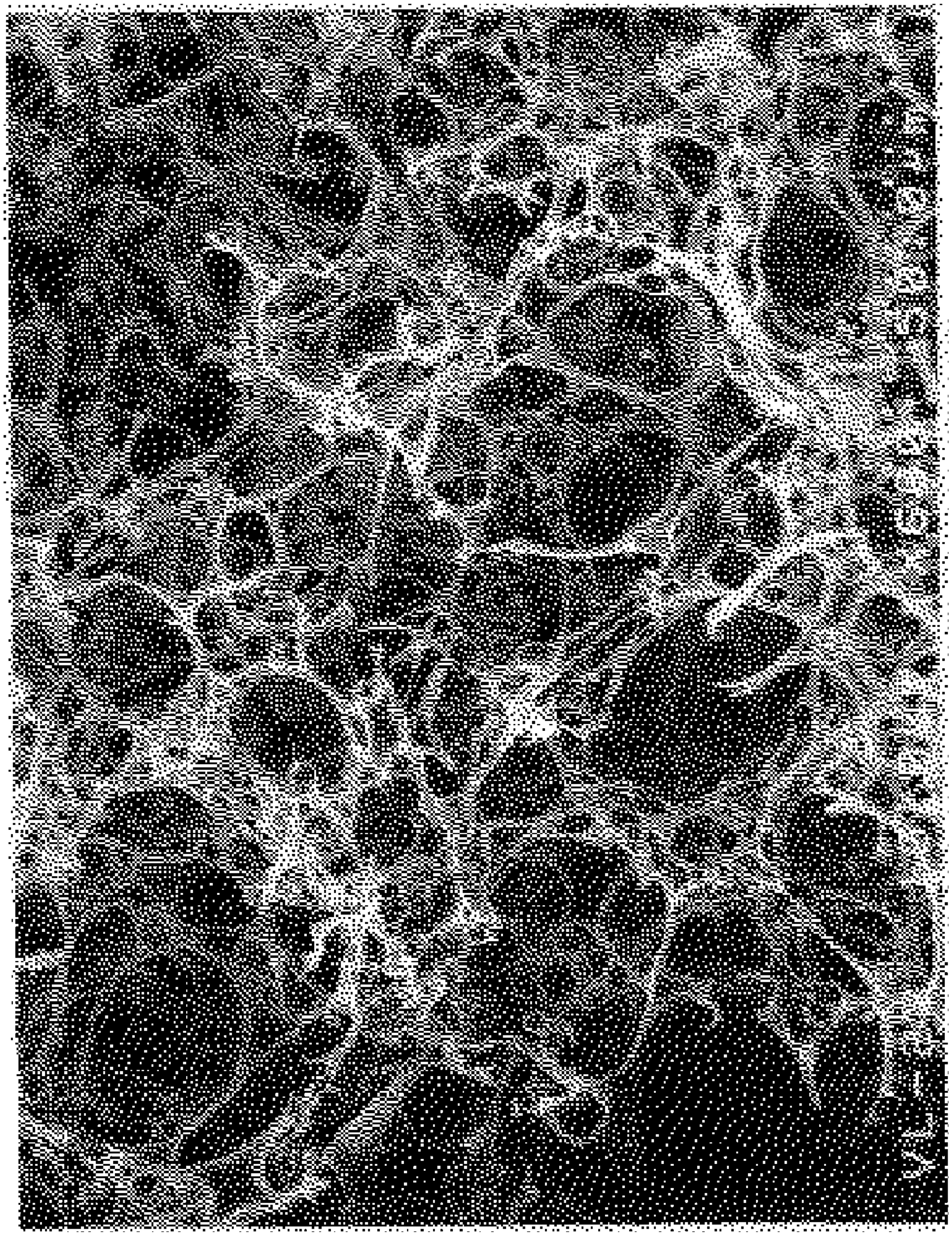
FIG. 7 An SEM photograph of a form example of a monolith intermediate (4).

The total pore volume per weight in a dry state of the monolith intermediate (4) obtained in step I is, for example, more than 16 mL/g, 30 mL/g or less, suitably more than 16 mL/g, 25 mL/g or less. As illustrated in FIG. 7, the monolith intermediate (4) has a skeleton whose shape is approximately a rod shape. This can co-exist in the polymerization system, thereby forming a porous body of a co-continuous structure, with, as a mold, the structure of the monolith intermediate (4).

In the monolith intermediate (4) obtained in step I, the average diameter of openings (mesopores) serving as overlapped portions of macropores and macropores in a dry state is, for example, in the range of 5 to 100 μm.

Step II in the method for producing the fourth monolith is, for example, a step of preparing a mixture containing an aromatic vinyl monomer, a crosslinking agent having two or more vinyl groups in one molecule, in the range of, for example, 0.3 to 5% by mol in the entire oil-soluble monomer, an organic solvent which, while dissolving the aromatic vinyl monomer and the crosslinking agent, does not dissolve any polymer produced by polymerization of the aromatic vinyl monomer, and a polymerization initiator. Herein, step I and step II may be performed in either order.

The aromatic vinyl monomer used in step II is not particularly limited so long as it is a lipophilic aromatic vinyl monomer containing a polymerizable vinyl group in a molecule and having high solubility in the organic solvent, and a vinyl monomer is preferably selected which allows for production of the same or similar polymer material as that of the monolith intermediate (4) co-existing in the polymerization system. Specific examples of the vinyl monomer include styrene, α-methylstyrene, vinyltoluene, vinylbenzyl chloride, vinylbiphenyl, and vinylnaphthalene. These monomers can be used singly or in combinations of two or more kinds thereof. An aromatic vinyl monomer suitably used is, for example, styrene or vinylbenzyl chloride.

The amount of addition of the aromatic vinyl monomer used in step II is, for example, in the range of 5 to 50 times, preferably in the range of 5 to 40 times that of the monolith intermediate (4) co-existing in polymerization, on a weight basis.

The crosslinking agent used in step II is preferably one containing at least polymerizable vinyl groups in a molecule and having high solubility in the organic solvent. The crosslinking agent is, for example, divinylbenzene, divinylnaphthalene, divinylbiphenyl, ethylene glycol dimethacrylate, trimethylolpropane triacrylate, or butanediol diacrylate. These crosslinking agents can be used singly or in combinations of two or more kinds thereof. The amount of use of the crosslinking agent is, for example, in the range of 0.3 to 5% by mol, in particular, in the range of 0.3 to 3% by mol based on the total amount (the entire oil-soluble monomer) of the vinyl monomer and the crosslinking agent. The amount of use of the crosslinking agent is preferably set so as to impart almost the same crosslinking density as the crosslinking density of the monolith intermediate (4) co-existing in polymerization of the vinyl monomer/crosslinking agent. If the amounts of use are very different from each other, bias may be easily caused in a crosslinking density distribution in a monolith produced, and cracking may easily occur during ion exchange group introduction reaction in the case of ion exchange group introduction.

The organic solvent used in step II is, for example, an organic solvent which, while dissolving the aromatic vinyl monomer and the crosslinking agent, does not dissolve any polymer produced by polymerization of the aromatic vinyl monomer: in other words, a poor solvent to a polymer produced by polymerization of the aromatic vinyl monomer. When the aromatic vinyl monomer is, for example, styrene, examples of the organic solvent include alcohols such as methanol, butanol, and octanol: linear (poly)ethers such as diethyl ether, polyethylene glycol, and polypropylene glycol: linear saturated hydrocarbons such as hexane, heptane, and octane; and esters such as ethyl acetate, isopropyl acetate, and ethyl propionate. Even a good solvent for polystyrene, such as dioxane, THF, or toluene, can be used as the organic solvent, provided that the good solvent is used in combination with the poor solvent and the amount of use thereof is small. The amount of use of the organic solvent can be set so that the concentration of the aromatic vinyl monomer is, for example, 30 to 80% by weight. If the amount of use of the organic solvent deviates from the above range and the concentration of the aromatic vinyl monomer is less than 30% by weight, the polymerization rate may be reduced or the monolith structure after polymerization may depart from the scope of the fourth monolith. On the other hand, if the concentration of the aromatic vinyl monomer is more than 80% by weight, polymerization may progress excessively.

The polymerization initiator used in step II in the method for producing the fourth monolith is the same as the polymerization initiator used in step II in the method for producing the third monolith.

Step III in the method for producing the fourth monolith is, for example, a step of subjecting the mixture obtained in step II to polymerization with still standing in the presence of the monolith intermediate (4) obtained in step I, to change the continuous macropore structure of the monolith intermediate (4) to a co-continuous structure and thus obtain a fourth monolith as a monolith having a co-continuous structure.

In step III, for example, the monolith intermediate (4) is placed in the state of being impregnated with the mixture (solution), in a reaction container. The mixture obtained in step II and the monolith intermediate (4) may be compounded, for example, at a ratio so that the amount of addition of the aromatic vinyl monomer is, for example, in the range of 5 to 50 times, preferably in the range of 5 to 40 times that of the monolith intermediate (4), on a weight basis, as described above. Thus, a fourth monolith of a co-continuous structure can be obtained where appropriately-sized holes are three-dimensionally continued and big-boned skeletons are three-dimensionally continued. The aromatic vinyl monomer and the crosslinking agent in the mixture in the reaction container are allowed to adsorb to and are dispensed in the skeleton of the monolith intermediate (4) left still standing, and polymerization progresses in the skeleton of the monolith intermediate (4).

Polymerization conditions in step III in the method for producing the fourth monolith are the same as those described as polymerization conditions in step III in the method for producing the third monolith. The fourth monolith ion exchanger can be obtained by performing step IV of ion exchange group introduction into the fourth monolith obtained in step III. The method for ion exchange group introduction into the fourth monolith is the same as the method for ion exchange group introduction into the first monolith.

(Fifth Monolith Ion Exchanger)

A fifth monolith ion exchanger is a monolith ion exchanger which includes a continuous skeleton phase and a continuous hole phase, in which such a skeleton contains a plurality of particle bodies fixed to a surface and having a diameter in the range of 4 to 40 μm or a plurality of protrusion bodies formed on a skeleton surface of an organic porous body and having a size in the range of 4 to 40 μm, the average diameter of the continuous holes is in the range of 10 to 200 μm, the total pore volume is in the range of 0.5 to 10 mL/g, the ion exchange capacity per weight in a dry state is in the range of 1 to 9 mg equivalents/g, and ion exchange groups are distributed in the organic porous ion exchanger.

The fifth monolith ion exchanger is a composite structure body having an organic porous body including a continuous skeleton phase and a continuous hole phase, and furthermore having a plurality of particle bodies or a plurality of protrusion bodies, and is a composite structure body having a large number of particle bodies or a large number of protrusion bodies. The fifth monolith ion exchanger and the production method thereof are disclosed in JP 2009-108294 A.

The plurality of particle bodies are fixed to a skeleton surface of the organic porous body, and the diameter thereof is, for example, in the range of 4 to 40 μm. The plurality of protrusion bodies are formed on a skeleton surface of the organic porous body, and the size thereof is, for example, in the range of 4 to 40 μm in a dry state. The diameters of the particle bodies or the sizes of the protrusion bodies are preferably in the range of 4 to 30 μm, more preferably in the range of 4 to 20 μm. Herein, the “particle bodies” and the “protrusion bodies” are collectively designated as “particle bodies or the like”.

The average diameter of the continuous holes in a dry state is preferably in the range of 10 to 200 μm.

The continuous skeleton phase and the continuous hole phase of the fifth monolith ion exchanger are observed in an SEM image. Examples of the basic structure of the fifth monolith ion exchanger include a continuous macropore structure and a co-continuous structure. The skeleton phase of the fifth monolith ion exchanger appears as a columnar continuous body, a continuous body with a depressed wall surface, or a composite thereof, and has a shape clearly different from a particle shape and a protrusion shape.

The fifth monolith ion exchanger includes a 5-1 monolith ion exchanger or a 5-2 monolith ion exchanger. The 5-monolith ion exchanger is a continuous macropore structure body where bubble-like macropores are overlapped and such overlapped portions serve as openings having an average diameter, for example, in the range of 10 to 120 μm in a dry state. The 5-2 monolith ion exchanger is a co-continuous structure body including a three-dimensionally continued skeleton where the thickness of such a continuous skeleton in a dry state is, for example, in the range of 0.8 to 40 μm, and, between such skeletons, three-dimensionally continued holes having an average diameter, for example, in the range of 8 to 80 μm in a dry state. The respective monoliths of the 5-1 and 5-2 monolith ion exchangers, before ion exchange group introduction, are called the 5-1 and 5-2 monoliths. The average diameter and the thickness of the continuous skeleton in a dry state are determined by the same methods as in the fourth monolith ion exchanger.

Figure 8:
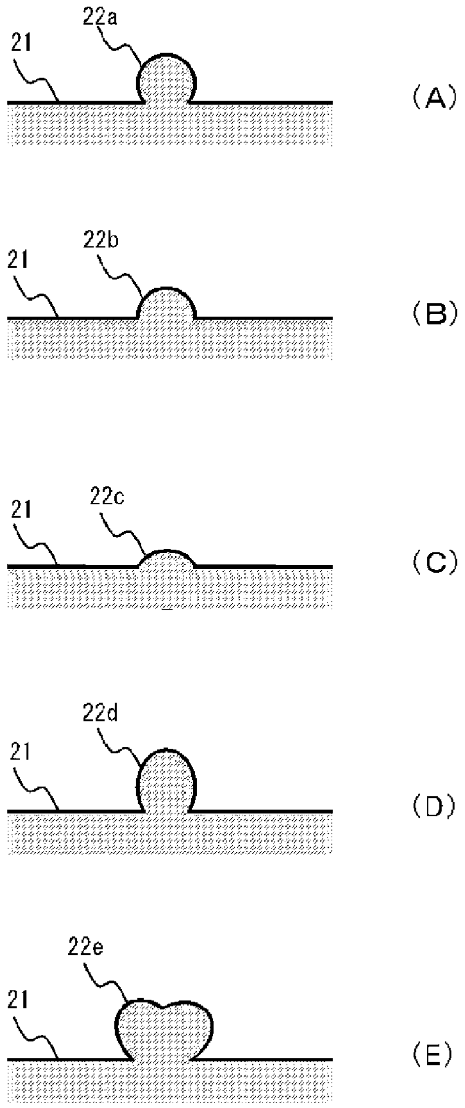
FIG. 8 A schematic section view of a protrusion body.
Figure 9:
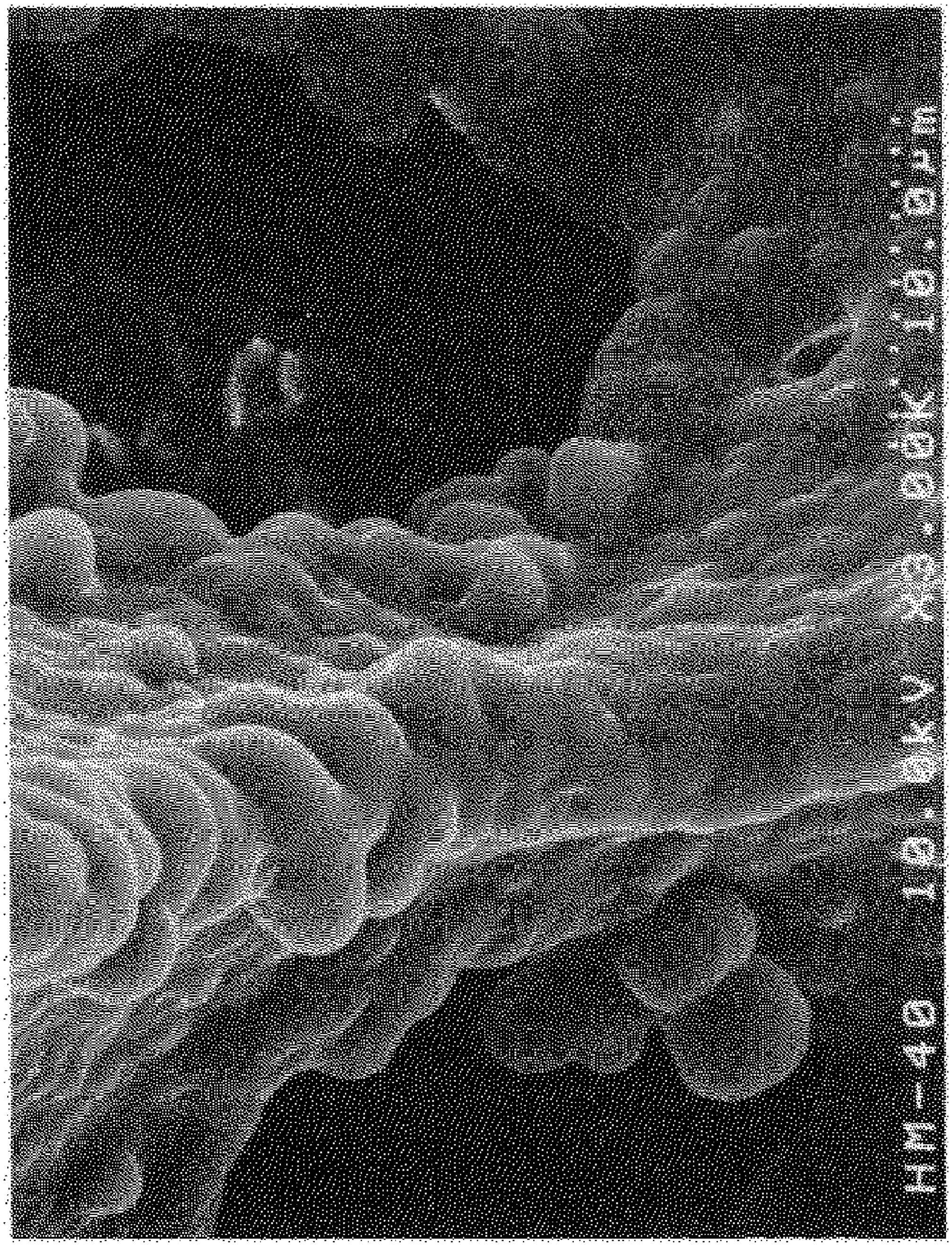
FIG. 9 An SEM photograph of a form example of a 5-1 monolith.

As illustrated in (A) to (E) in FIG. 8, protruded articles from a skeleton surface 21 are protrusion bodies 22*a* to 22*e*. As illustrated in (A), the protrusion body 22*a* has a shape approximate to a particle shape. As illustrated in (B), the protrusion body 22*b* is semispherical. As illustrated in (C), the protrusion body 22*c* has a shape like an elevation of the skeleton surface. As illustrated in (D), the length of the protrusion body 22*d* in the vertical direction to the skeleton surface 21 is greater than the length of the protrusion body 22*d* in the lateral direction to the skeleton surface 21. As illustrated in (E), the protrusion body 22*e* has a shape protruded in a plurality of directions. The size of each of the protrusion bodies corresponds to the length of a portion of each of the protrusion bodies, the portion having the maximum width in an SEM image. As illustrated in FIG. 9, the fifth monolith ion exchanger is such that a plurality of protrusion bodies are formed on a skeleton surface of an organic porous body.

The proportion of particle bodies or the like in the range of 4 to 40 μm in a dry state, in all particle bodies or the like in the fifth monolith ion exchanger, is, for example, 70% or more, preferably 80% or more. The proportion of the particle bodies or the like refers to the proportion of the number of particle bodies or the like of a specified size in a dry state in the number of all particle bodies or the like. For example, 40% or more, preferably 50% or more of the surface of the skeleton phase is covered with all particle bodies or the like. Herein, the covering proportion of the surface of the skeleton layer with all particle bodies or the like refers to the area proportion in an SEM image in observation of the surface with SEM: namely, the area proportion in a plan view of the surface. If the size of particles with which the wall surface or the skeleton is covered deviates from the above range, the effect of improving the contact efficiency of a liquid with the skeleton surface and the skeleton interior of the monolith ion exchanger may be easily decreased.

The fifth monolith ion exchanger in a dry state is observed with an SEM at least three times, the diameters or sizes of all particle bodies or the like in a dry state in an SEM image in the entire field of view are calculated, and whether or not particle bodies or the like having a diameter or size, for example, in the range of 4 to 40 μm are observed is confirmed. When such confirmation is achieved in the entire field of view, it is determined that particle bodies or the like having a diameter or size, for example, in the range of 4 to 40 μm, in a dry state are formed on the skeleton surface of the fifth monolith ion exchanger. In addition, the diameters or sizes of all particle bodies or the like in a dry state, in an SEM image, are calculated with respect to each field of view according to the above, and the proportion of particle bodies or the like, for example, in the range of 4 to 40 μm in a dry state, in all particle bodies or the like, is determined with respect to each field of view. When the proportion of particle bodies or the like, for example, in the range of 4 to 40 μm in a dry state, in all particle bodies or the like, is 70% or more in the entire field of view, it is determined that the proportion of particle bodies or the like, for example, in the range of 4 to 40 μm in a dry state, in all particle bodies or the like formed on the skeleton surface of the fifth monolith ion exchanger, is 70% or more. In addition, the covering proportion of the surface of the skeleton layer with all particle bodies or the like, in an SEM image, is determined with respect to each field of view according to the above. When the covering proportion of the surface of the skeleton layer with all particle bodies or the like is 40% or more in the entire field of view, it is determined that the covering proportion of the surface of the skeleton layer with all particle bodies or the like in the fifth monolith ion exchanger is 40% or more.

If the covering rate of the skeleton phase surface with particle bodies or the like in the fifth monolith ion exchanger is less than 40%, the effect of improving the contact efficiency of a reaction liquid with the skeleton internal and the skeleton surface of the monolith ion exchanger may be easily decreased. Examples of the method for measuring the covering rate with particle bodies or the like include an image analysis method with an SEM image of the fifth monolith ion exchanger.

The total pore volume per weight in a dry state of the fifth monolith ion exchanger is, for example, in the range of 0.5 to 10 mL/g, preferably in the range of 0.8 to 8 mL/g. If the total pore volume is less than 0.5 mL/g, the pressure loss during liquid sending may be increased and furthermore the amount of penetration of a fluid per unit cross-section area may be reduced to lead to a reduction in treatment capacity, in the case of sending of a reaction liquid with a reaction container being filled with the platinum group metal-supported catalyst. If the total pore volume is more than 10 mL/g, the monolith ion exchanger may be deformed in the case of lowered mechanical strength and sending of a reaction liquid with a reaction container being filled with the platinum group metal-supported catalyst, in particular, in the case of liquid sending at a high flow velocity. Furthermore, the contact efficiency between a reaction liquid and the monolith ion exchanger may be reduced.

The crosslinking density of the polymer material constituting the skeleton in the fifth monolith ion exchanger may be such that a crosslinked structure unit is contained, for example, in the range of 0.3 to 10% by mol, suitably in the range of 0.3 to 5% by mol, in all constituent units constituting the polymer material. The organic polymer material constituting the skeleton of the fifth monolith ion exchanger is the same as in the first monolith ion exchanger.

The material constituting the skeleton phase of the organic porous body and that of particle bodies or the like formed on the surface of the skeleton phase, in the fifth monolith ion exchanger are, for example, the same materials where the same textures are continued or materials different from each other where textures which are not the same are continued. Examples of such a case of materials different from each other where textures which are not the same are continued include a case of materials different from each other in terms of types of the vinyl monomers, and a case of materials which, while being the same in terms of the types of the vinyl monomers and the crosslinking agents, differ from each other in terms of the compounding proportions thereof.

The fifth monolith ion exchanger has a thickness of, for example, 1 mm or more, and is distinguished from a film-type porous body. The fifth monolith ion exchanger preferably has a thickness in the range of 3 to 1000 mm.

The ion exchange capacity per weight in a dry state is as described above. The “ion exchange groups distributed in the organic porous ion exchanger” are as described above.

(Method for Producing Fifth Monolith Ion Exchanger)

The fifth monolith ion exchanger can be produced by, for example, the following method.

The fifth monolith can be obtained by, for example, preparing a water-in-oil type emulsion and then performing the following steps I to III. In step I, for example, the water-in-oil type emulsion can be subjected to polymerization to obtain a monolithic organic porous intermediate (hereinafter, monolith intermediate (5)) having a continuous macropore structure where the total pore volume is, for example, in the range of 5 to 30 mL/g. In step II, for example, a mixture is prepared which contains a vinyl monomer, a crosslinking agent having two or more vinyl groups in one molecule, an organic solvent which, while dissolving the vinyl monomer and the crosslinking agent, does not dissolve any polymer produced by polymerization of the vinyl monomer, and a polymerization initiator. In step III, for example, the mixture obtained in step II can be subjected to polymerization with being left to still stand in the presence of the monolith intermediate (5) obtained in step I, to thereby obtain the fifth monolith.

Step I in the method for producing the fifth monolith is the same as step I in the method for producing the third monolith.

A polymerization initiator may be, if necessary, used in formation of the water-in-oil type emulsion in step I. The polymerization initiator here used is suitably a compound which generates a radical by heat or light irradiation. The polymerization initiator may be water-soluble or oil-soluble, and examples thereof include 2,2'-azobis(isobutyronitrile), 2,2'-azobis(2,4-dimethylvaleronitrile), 2,2'-azobis(2-methylbutyronitrile), 2,2'-azobis(4-methoxy-2,4-dimethylvaleronitrile), dimethyl 2,2'-azobisisobutyrate, 4,4'-azobis(4-cyanovaleric acid), 1,1'-azobis(cyclohexane-1-carbonitrile), benzoyl peroxide, lauroyl peroxide, potassium persulfate, ammonium persulfate, hydrogen peroxide-ferrous chloride, and sodium persulfate-acidic sodium sulfite.

The monolith intermediate (5) obtained in step I has a continuous macropore structure. This can co-exist in the polymerization system, thereby forming particle bodies or the like on a surface of the skeleton phase of the continuous macropore structure or forming particle bodies or the like on a surface of the skeleton phase of the co-continuous structure, with, as a template, the structure of the monolith intermediate (5). The monolith intermediate (5) is an organic polymer material having a crosslinked structure. The crosslinking density of the polymer material is preferably such that a crosslinked structure unit is contained, for example, in the range of 0.3 to 10% by mol, preferably in the range of 0.3 to 5% by mol, in all constituent units constituting the polymer material.

The type of the polymer material of the monolith intermediate (5) is the same as the type of the polymer material of the monolith intermediate (3) in the method for producing the third monolith.

The total pore volume per weight in a dry state of the monolith intermediate (5) obtained in step I is, for example, in the range of 5 to 30 mL/g, suitably in the range of 6 to 28 mL/g. In order that the total pore volume of the monolith intermediate (5) is within the numerical value range, the ratio (weight) between the monomer and water may be, for example, approximately 1:5 to 1:35.

In step I, when the ratio between the monomer and water is approximately 1:5 to 1:20, one having a continuous macropore structure where the total pore volume of the monolith intermediate (5) is, for example, 5 to 16 mL/g is obtained, and the monolith obtained through step III is the 5-1-th monolith. On the other hand, when the ratio between the monomer and water is approximately 1:20 to 1:35, one having a continuous macropore structure where the total pore volume of the monolith intermediate (5) is, for example, more than 16 mL/g and 30 mL/g or less is obtained, and the monolith obtained through step III is the 5-2 monolith.

In the monolith intermediate (5) obtained in step I in the method for producing the fifth monolith, the average diameter of openings (mesopores) serving as overlapped portions of macropores and macropores in a dry state is, for example, 20 to 200 μm.

Step II in the method for producing the fifth monolith is the same as step II in the method for producing the third monolith. In step III in the method for producing the fifth monolith, for example, the mixture obtained in step II can be subjected to polymerization with being left to still stand in the presence of the monolith intermediate (5) obtained in step I, to thereby obtain the fifth monolith.

As disclosed in JP Hei7-501140 A, when the vinyl monomer and the crosslinking agent are subjected to polymerization with being left still standing, in a specified organic solvent in the absence of the monolith intermediate (5), a particle-aggregated monolithic organic porous body can be obtained. On the contrary, when the monolith intermediate (5) having a continuous macropore structure is present in the polymerization system, the structure of a composite monolith after polymerization is dramatically changed, and a fifth monolith having not a particle-aggregated structure, but the above specified skeleton structure can be obtained.

The inner volume of the reaction container in step III in the method for producing the fifth monolith is not particularly limited so long as it is a size allowing the monolith intermediate (5) to be present in the reaction container. There can be adopted any of one enabling a space to be formed around the monolith in a plan view in the case of the monolith intermediate (5) mounted in the reaction container, and one allowing the monolith intermediate (5) to be placed in the reaction container with almost no space. In particular, one allowing the fifth monolith after polymerization to be placed in the reaction container with almost no press applied from the inside wall of the container and with almost no space is efficient, because of almost no strain generated on the fifth monolith and almost no waste of a reaction raw material or the like. Even when the inner volume of the reaction container is large and any space is present around the fifth monolith after polymerization, the vinyl monomer and the crosslinking agent are allowed to adsorb to and dispensed in the monolith intermediate (5), and thus almost no particle-aggregated structure article is generated in a space portion in the reaction container.

In step III, for example, the monolith intermediate (5) is placed in the state of being impregnated with the mixture (solution), in the reaction container. The mixture obtained in step II and the monolith intermediate (5) may be compounded at a ratio so that the amount of addition of the vinyl monomer is, for example, in the range of 3 to 50 times, preferably in the range of 4 to 40 times that of the monolith intermediate (5), on a weight basis, as described above. Thus, a fifth monolith can be obtained which is a composite monolith having an appropriate opening size and also having a specified skeleton. The vinyl monomer and the crosslinking agent in the mixture in the reaction container are allowed to adsorb to and dispensed in the skeleton of the monolith intermediate (5) left still standing, and polymerization progresses in the skeleton of the monolith intermediate (5).

Polymerization conditions in step III in the method for producing the fifth monolith are almost the same as those in step III in the method for producing the third monolith. When the fifth monolith is produced, a monolith with particle bodies or the like formed on a skeleton surface can be produced by carrying out step II or step III under a condition satisfying at least one of the following (1) to (5).

(1) The polymerization temperature in step III is a temperature lower by at least 5° C. than the 10-hour half-life temperature of the polymerization initiator.

(2) The percentage by mol of the crosslinking agent used in step II is twice or more the percentage by mol of the crosslinking agent used in step I.

(3) The vinyl monomer used in step II is a vinyl monomer having a different structure from that of the oil-soluble monomer used in step I.

(4) The organic solvent used in step II is a polyether having a molecular weight of 200 or more.

(5) The concentration of the vinyl monomer used in step II is 30% by weight or less in the mixture in step II.

Examples of a preferable structure of the fifth monolith thus obtained include a continuous macropore structure body ("5-1-th monolith") where bubble-like macropores are overlapped and such overlapped portions serve as openings having an average diameter, for example, in the range of 10 to 120 μm in a dry state and a co-continuous structure body ("5-2 monolith") including a three-dimensionally continued skeleton where the thickness of such a continuous skeleton in a dry state is, for example, in the range of 0.8 to 40 μm, and, between such skeletons, three-dimensionally continued holes having a diameter, for example, in the range of 8 to 80 μm in a dry state. The method for ion exchange group introduction into the fifth monolith is the same as the method for ion exchange group introduction into the first monolith.

[Platinum Group Metal-Supported Catalyst]

The platinum group metal-supported catalyst used in the catalytic hydrogenation reduction method according to the present embodiment is a catalyst where at least one of platinum group metal ions, platinum group metal complex ions, and platinum group metal nanoparticles having an average particle size in the range of 1 to 100 nm is supported on the non-particulate weakly basic organic porous ion exchanger, for example, any of the first monolith ion exchanger to the fifth monolith ion exchanger. In other words, a platinum group metal in a nanoparticle state or an ion state is supported on the non-particulate weakly basic organic porous ion exchanger in the platinum group metal-supported catalyst. For example, the platinum group metal-supported catalyst is a catalyst where platinum group metal ions or platinum group metal complex ions are bound to weak anion exchange groups, for example, tertiary amino groups such as dimethylamino groups or diethylamino groups in the ion exchanger, by ionic bonds or coordinate bonds.

The platinum group metal is ruthenium, rhodium, palladium, osmium, iridium, or platinum. These platinum group metals may be adopted singly or in combinations of two or more kinds thereof, or as an alloy of two or more kinds thereof. In particular, platinum, palladium, and a platinum/palladium alloy are preferable from the viewpoint of an increase in catalyst activity.

The average particle size of platinum group metal nanoparticles is in the range of 1 to 100 nm, preferably in the range of 1 to 50 nm, further preferably in the range of 1 to 20 nm. If the average particle size of platinum group metal nanoparticles is less than 1 nm, platinum group metal particles may be released from a carrier, and if the average particle size is more than 100 nm, the surface area per unit mass of the metal may be decreased so as not to allow the catalyst effect to be efficiently obtained.

The average particle size of platinum group metal nanoparticles is determined by analyzing a TEM image obtained by transmission-type electron microscope (TEM) analysis. Specifically, first, the surface of the platinum group metal-supported catalyst is subjected to TEM analysis. Next, one field of view, where the number of particles is 200 or more, is arbitrarily selected from the TEM image obtained, and a TEM image of such a field of view is subjected to image analysis to measure the particle sizes of all particles in such a field of view. If the number of platinum group metal particles supported, in one field of view, is less than 200, two or more fields of view are arbitrarily selected and the particle sizes of all particles are measured in such two or more fields of view selected. Next, the average particle size of platinum group metal nanoparticles is calculated by expression "Average particle size (nm) of platinum group metal particles=Total particle size (nm) of all particles subjected to measurement/Number of particles subjected to measurement (number)".

The platinum group metal ions are each an ion of the platinum group metal, and the valence of such a platinum group metal ion is varied depending on the type of the platinum group metal. These platinum group metal ions may be formed from one kind of metal or a combination of two or more kinds of metals. In particular, platinum ions and palladium ions are preferable, from the viewpoint of an increase in catalyst activity.

The platinum group metal complex ions are each a complex ion of the platinum group metal, and are not particularly limited so long as these are each a platinum group metal complex ion. Examples of a platinum group metal compound include tetrachloropalladate ions, tetraamminepalladium ions, hexachloropalladate ions, tetrachloroplatinate ions, hexachloroplatinate ions, tetraammineplatinum ions, hexaammineplatinum ions, tetranitroplatinate ions, hexahydroxoplatinate ions, hexaamminerhodium ions, hexachloroiridium ions, hexaammineiridium ions, hexachlororuthenium ions, hexaammineruthenium ions, and hexaammineosmium ions. These platinum group metal complex ions may be formed from one kind of metal or a combination of two or more kinds of metals. In particular, platinum complex ions and palladium complex ions are preferable from the viewpoint of an increase in catalyst activity.

Whether or not the platinum group metal or the like is supported on the platinum group metal-supported catalyst is confirmed by transmission-type electron microscope (TEM) observation.

The amount of support of the platinum group metal or the like in the platinum group metal-supported catalyst ((Weight in terms of platinum group metal atom/Weight of platinum group metal-supported catalyst in dry state)×100) is in the range of 0.01 to 10% by weight, preferably in the range of 0.1 to 5.0% by weight, in a dry state. If the amount of support of the platinum group metal or the like is less than 0.01% by weight in a dry state, catalyst activity may be insufficient, and if the amount is more than 10% by weight, metal elution in water may be observed. Herein, the amount of a platinum group metal atoms in the platinum group metal-supported catalyst is quantitatively determined with an ICP emission spectroscopic analysis apparatus.

The method for producing the platinum group metal-supported catalyst is not particularly limited, and the platinum group metal-supported catalyst is obtained by supporting the platinum group metal or the like on the monolith ion exchanger according to a known method. Examples include a method involving immersing the monolith ion exchanger in a dry state in an organic solution of the platinum group metal compound at a predetermined temperature for a predetermined time, to allow platinum group metal ions to adsorb to and be supported on the monolith ion exchanger by ion exchange, and a method involving immersing the monolith ion exchanger in an aqueous solution of a platinum group metal complex compound such as a tetraamminepalladium complex at a predetermined temperature for a predetermined time, to allow platinum group metal ions to adsorb to and be supported on the monolith ion exchanger by ion exchange.

The platinum group metal or the like may be supported on the monolith ion exchanger in a batch system or in a flow system without any particular limitation.

The platinum group metal compound used in the method for producing the platinum group metal-supported catalyst may be any of an organic salt and an inorganic salt, and examples thereof include halide, sulfate, nitrate, phosphate, an organic acid salt, and an inorganic complex salt. Specific examples of the platinum group metal compound include palladium chloride, palladium nitrate, palladium sulfate, palladium acetate, tetraamminepalladium chloride, tetraamminepalladium nitrate, platinum chloride, tetraammineplatinum chloride, tetraammineplatinum nitrate, chlorotriammineplatinum chloride, hexaammineplatinum chloride, hexaammineplatinum sulfate, chloropentaammineplatinum chloride, cis-tetrachlorodiammineplatinum chloride, trans-tetrachlorodiammineplatinum chloride, rhodium chloride, rhodium acetate, hexaamminerhodium chloride, hexaamminerhodium bromide, hexaamminerhodium sulfate, pentaammineaquarhodium chloride, pentaammineaquarhodium nitrate, cis-dichlorotetraamminerhodium chloride, trans-dichlorotetraamminerhodium chloride, ruthenium chloride, hexaammineruthenium chloride, hexaammineruthenium bromide, hexaammineruthenium iodide, chloropentaammineruthenium chloride, cis-dichlorotetraammineruthenium chloride, trans-dichlorotetraamminerhodium chloride, iridium(III) chloride, iridium(IV) chloride, hexaammineiridium chloride, hexaammineiridium nitrate, chloropentaammineiridium chloride, chloropentaammineiridium bromide, hexaammineosmium chloride, hexaammineosmium bromide, and hexaammineosmium iodide. The amount of use of such a compound is, for example, 0.005 to 30% by weight in terms of metal, relative to the monolith ion exchanger as a carrier.

The platinum group metal compound, when supports the platinum group metal or the like, is usually dissolved in a solvent and then used. The solvent here used is water; alcohol such as methanol, ethanol, propanol, butanol, or benzyl alcohol: ketone such as acetone or methyl ethyl ketone: nitrile such as acetonitrile: amide such as dimethylformamide, dimethylacetamide, or N-methylpyrrolidone: or a mixture thereof. An acid such as hydrochloric acid, sulfuric acid, or nitric acid, or a base such as sodium hydroxide or tetramethylammonium hydroxide may also be added in order to enhance the solubility of the platinum group metal compound in the solvent.

The reducing agent used in the method for producing the platinum group metal-supported catalyst is not particularly limited, and examples thereof include reducing gases such as hydrogen and ethylene; alcohols such as methanol, ethanol, propanol, butanol, and benzyl alcohol: carboxylic acids and salts thereof, such as formic acid, ammonium formate, oxalic acid, citric acid, sodium citrate, ascorbic acid, and calcium ascorbate; aldehydes such as formaldehyde and acetaldehyde: hydrazines such as hydrazine, methylhydrazine, ethylhydrazine, butylhydrazine, allylhydrazine, and phenylhydrazine; hypophosphites such as sodium hypophosphite and potassium hypophosphite; and boron sodium hydride.

Reaction conditions of reduction reaction are also not particularly limited, and, for example, the reaction is performed at a temperature of −20° C. to 150° C. for 1 minute to 24 hours, to reduce the platinum group metal compound to a zero-valent platinum group metal.

[Catalytic Hydrogenation Reduction Method]

The catalytic hydrogenation reduction method according to the present embodiment is a method including contacting a reaction substrate and a hydrogen source in the presence of the platinum group metal-supported catalyst to thereby perform catalytic hydrogenation reduction of the reaction substrate.

Examples of the hydrogen source include reducing gases such as hydrogen; alcohols such as methanol, ethanol, and propanol: hydrazines such as hydrazine, methylhydrazine, allylhydrazine, and phenylhydrazine, and derivatives and salts thereof; formic acid and salts thereof; and hypophosphorous acid and salts thereof. Among these hydrogen sources, hydrogen or hydrazine is preferably used.

The amount of use of the hydrogen source may be, for example, in the range of 1 to 100 times by mol, relative to the reaction substrate.

The method for introducing the hydrogen source into the reaction system is not particularly limited, and, for example, when the hydrogen source is hydrogen, hydrogen may be introduced into the reaction system at ordinary pressure or under pressure. When the hydrogen source is hydrazine, hydrazine may be formed into an aqueous solution thereof and the solution may be introduced into the reaction system.

The reaction substrate is a compound having a functional group or a moiety to be hydrogenated, and is not particularly limited, and examples thereof include a compound having an unsaturated bond such as a carbon-carbon double bond or a carbon-carbon triple bond, a compound having a nitro group, such as an aromatic nitro compound, a compound having an ester group, such as aromatic benzyl ester, and a compound having a carbonyl group. Further specific examples of the reaction substrate include an aromatic nitro compound, an aromatic benzyl ester compound, an aromatic benzyl ether compound, aromatic halide, a compound having an N-benzyloxycarbonyl group, alkyne, and alkene.

Such compounds are each converted into an aromatic amino compound, a compound having a carboxyl group, a compound having a hydroxyl group, an aromatic hydrocarbon compound, a compound having an amino group, alkane, or the like, by catalytic hydrogenation reduction reaction.

The amount of use of the platinum group metal-supported catalyst is, for example, in the range of 0.000001 to 1 mol in terms of the platinum group metal supported, based on 1 mol of the reaction substrate.

Not only the reaction substrate, the platinum group metal-supported catalyst, and the hydrogen source, but also a solvent may also be used in the catalytic hydrogenation reduction method according to the present embodiment. Specific examples of the solvent include water: alcohols such as methanol, ethanol, propanol, and butanol: ketones such as acetone, methyl ethyl ketone, and methyl isobutyl ketone: nitriles such as acetonitrile and butyronitrile: halogenated hydrocarbons such as dichloromethane, chloroform, carbon tetrachloride, and dichloroethane: ethers such as diethyl ether, dimethoxymethane, dimethoxyethane, and tetrahydrofuran: aliphatic hydrocarbons such as hexane, cyclohexane, heptane, and octane: aromatic hydrocarbons such as benzene, toluene, xylene, and naphthalene; and esters such as ethyl acetate and butyl acetate. These solvents may be used singly or as a mixture of two or more kinds thereof. The solvent to be used or a combination thereof can also be selected to thereby control selectivity of catalytic hydrogenation reduction reaction.

Reaction conditions in the catalytic hydrogenation reduction method according to the present embodiment are not particularly limited, and the reaction temperature is, for example, in the range of −20° C. to 200° C., preferably in the range of 10 to 100° C. The reaction time is, for example, in the range of 1 minute to 48 hours, preferably in the range of 5 minutes to 24 hours. The reaction pressure is, for example, in the range of ordinary pressure to 10 MPa, preferably in the range of ordinary pressure to 5 MPa.

Examples of the hydrogenation reduction reaction include reduction of a nitro group to an amino group, reduction of an azide group to an amino group, reduction of a carbon-carbon double bond, reduction of a carbon-carbon triple bond, detachment of a hydroxyl group as a benzyl protection group, a protection group of a carboxyl group, or the like, detachment of a protection group of an amino group, such as a benzyloxycarbonyl group (Cbz group), reduction of epoxide to alcohol, and reduction and deoxygenization reaction of aromatic ketone to alcohol.

Examples of a preferable form example of the catalytic hydrogenation reduction method include a fixed bed continuous flow-type catalytic hydrogenation reduction method for performing catalytic hydrogenation reduction of the reaction substrate by continuously feeding the reaction substrate and the hydrogen source to, for example, a cylindrical reaction container filled with the platinum group metal-supported catalyst and thus continuously contacting the reaction substrate and the hydrogen source in the presence of the platinum group metal-supported catalyst.

Figure 17:
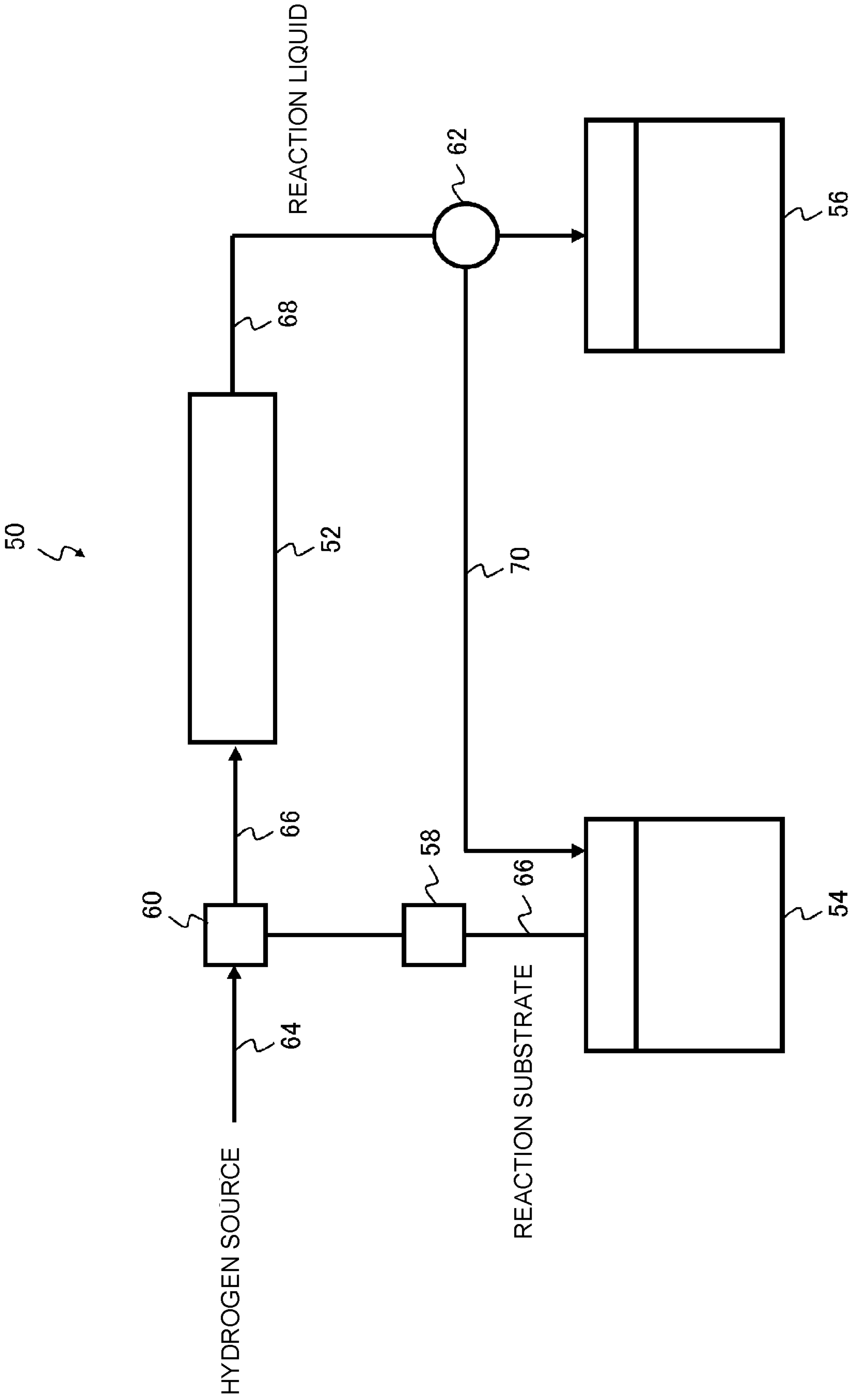
FIG. 17 A schematic configuration view illustrating one example of a catalytic hydrogenation reduction apparatus for performing a catalytic hydrogenation reduction method according to the present embodiment.

FIG. 17 illustrates one example of a configuration of a reaction apparatus for performing such a fixed bed continuous flow-type catalytic hydrogenation reduction method.

A catalytic hydrogenation reduction apparatus 50 illustrated in FIG. 17 includes, for example, a cylindrical reaction container 52 filled with the platinum group metal-supported catalyst, a reaction substrate container 54 to which the reaction substrate is to be placed, a reaction substrate feed pump 58 for feeding the reaction substrate to the reaction container 52, a mixer 60 as a mixing unit for mixing the hydrogen source with the reaction substrate, a reaction liquid receiver 56 for receiving a reaction liquid discharged from the reaction container 52, a reaction substrate feed pipe 66 which connects the reaction substrate container 54 and the reaction container 52 and in the middle of which the reaction substrate feed pump 58 and the mixer 60 are provided, a hydrogen source feed pipe 64 connected to the mixer 60, a reaction liquid discharge pipe 68 which connects the reaction container 52 and the reaction liquid receiver 56 and in the middle of which a switching valve 62 is provided, and a circulation pipe 70 which is branched from the reaction liquid discharge pipe 68, at the switching valve 62, and connected to the reaction substrate container 54. A heating unit for heating the reaction container 52 may be, if necessary, attached in the reaction container 52.

The reaction substrate is continuously fed from the reaction substrate container 54 to the reaction container 52 by the reaction substrate feed pump 58, in the catalytic hydrogenation reduction apparatus 50. Here, the hydrogen source continuously fed from the hydrogen source feed pipe 64 is mixed with the reaction substrate in the mixer 60 provided in the middle of the reaction substrate feed pipe 66. A reaction raw material as a mixture of the reaction substrate and the hydrogen source is then fed to the reaction container 52. The reaction raw material fed into the reaction container 52 passes in the platinum group metal-supported catalyst with which the reaction container 52 is filled, specifically, continuous holes in the non-particulate weakly basic organic porous ion exchanger. Thus, the reaction substrate and the hydrogen source are continuously contacted in the presence of the platinum group metal-supported catalyst, to thereby perform catalytic hydrogenation reduction of the reaction substrate. Next, a reaction liquid after catalytic hydrogenation reduction is delivered to the reaction liquid receiver 56 through the reaction liquid discharge pipe 68. The reaction liquid after catalytic hydrogenation reduction may be returned to the reaction substrate container 54 through the circulation pipe 70 branched from the reaction liquid discharge pipe 68. Here, switching between delivery of the reaction liquid to the reaction liquid receiver 56 and return thereof to the reaction substrate container 54 is performed by the switching valve 62. Such switching between delivery of the reaction liquid to the reaction liquid receiver 56 and return thereof to the reaction substrate container 54 can be performed, to thereby allow for both reaction by liquid sending to a platinum group metal-supported catalyst layer of the reaction container 52 only once and reaction by liquid sending to such a platinum group metal-supported catalyst layer twice or more.

Reaction conditions in such a fixed bed continuous flow-type catalytic hydrogenation reduction method are not particularly limited and, for example, the reaction temperature is in the range of −20° C. to 200° C., preferably in the range of 10 to 100° C. The reaction pressure is, for example, in the range of ordinary pressure to 10 MPa, preferably in the range of ordinary pressure to 5 MPa.

The platinum group metal-supported catalyst is high in contact efficiency with the reaction substrate as a reaction raw material and the hydrogen source, and thus catalytic hydrogenation reduction reaction, when performed in a fixed bed continuous flow system, can be sufficiently performed even at an increased rate of liquid sending. This can allow for an increase in space velocity (SV). The space velocity (SV) is, for example, in the range of 0.1 to 10000 $h^{-1}$, preferably in the range of 1 to 1000 $h^{-1}$.

The size of the reaction container 52, the thickness of a filling layer with the platinum group metal-supported catalyst, the flow velocity of the reaction substrate, the flow velocity of the hydrogen source, the pressure of the hydrogen source, the direction of flowing of the reaction substrate and the hydrogen source (upward, downward, or lateral), and the like in the catalytic hydrogenation reduction apparatus 50 may be appropriately selected depending on the type of the reaction, reaction conditions, and the like.

The platinum group metal-supported catalyst used in the catalytic hydrogenation reduction method according to the present embodiment is high in reaction rate and high in catalyst activity, as compared with a conventional platinum group metal-supported catalyst. In addition, homogeneous organic reaction where a catalyst is dissolved in a reaction solvent needs to be performed in a basic reaction solvent in order that the reaction field is basic. On the contrary, use of the platinum group metal-supported catalyst can allow the carrier interior serving as the reaction field to be basic with the reaction solvent being neutral.

EXAMPLES

Hereinafter, the present invention will be more specifically described with reference to Examples and Comparative Examples, but the present invention is not limited to the following Examples.

[Production of Weakly Basic Monolith Anion Exchanger]

A monolith was produced according to the method for producing the fifth monolith ion exchanger, and ion exchange groups were introduced into the monolith obtained.

(Production of Monolith Intermediate (Step I))

Figure 10:
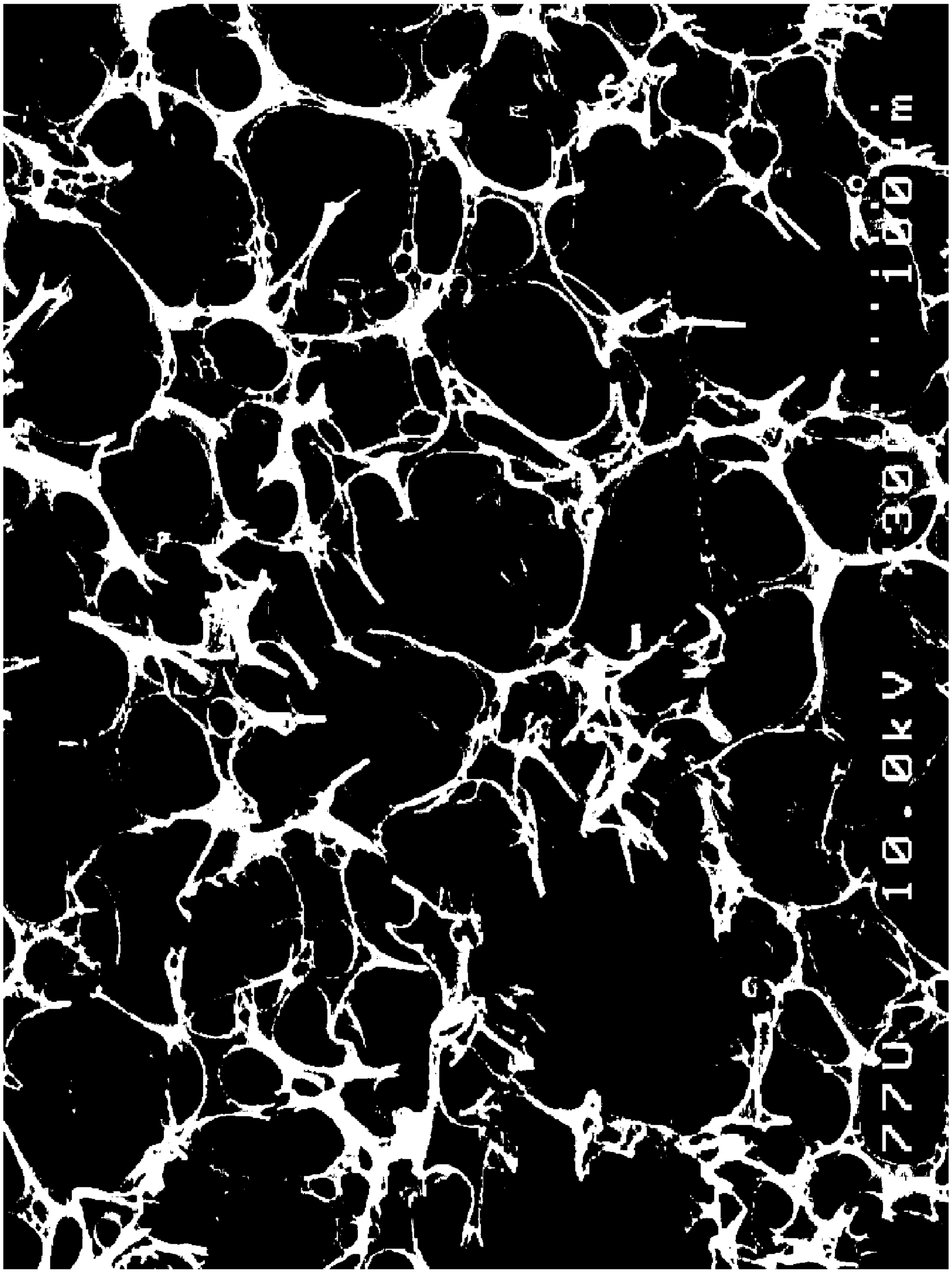
FIG. 10 An SEM photograph of a monolith intermediate obtained in Examples.

Mixed were 9.28 g of styrene as a monomer, 0.19 g of divinylbenzene, 0.50 g of sorbitan monooleate (hereinafter, abbreviated as "SMO") as a surfactant, and 0.25 g of 2,2'-azobis(isobutyronitrile) as a polymerization initiator, and these were dissolved so as to be homogeneous. Next, this styrene/divinylbenzene/SMO/2,2'-azobis(isobutyronitrile) mixture was added to 180 g of pure water, and stirred under reduced pressure by use of a vacuum stirring defoaming mixer (manufactured by EME Corporation) as a planetary stirring apparatus, to thereby obtain a water-in-oil type emulsion. The emulsion was rapidly transferred to a reaction container, and subjected to tight sealing and then polymerization under still standing at 60° C. for 24 hours. After termination of the polymerization, the content was taken out and extracted with methanol, and then dried under reduced pressure, to thereby produce a monolith intermediate having a continuous macropore structure. The internal structure of the monolith intermediate (dry body) thus obtained was observed with SEM. FIG. 10 illustrates an SEM image. A wall portion partitioning adjacent two macropores, while was extremely thin and had a rod shape, had a continuous macropore structure, and the average diameter of openings (mesopores) in overlapped portions of macropores and macropores was 40 μm and the total pore volume was 18.2 mL/g, as measured by a mercury intrusion technique.

(Production of Monolith (Step II))

Next, 216.6 g of styrene as a monomer, 4.4 g of divinylbenzene as a crosslinking agent, 220 g of 1-decanol as an organic solvent, and 0.8 g of 2,2'-azobis(2,4-dimethylvaleronitrile) as a polymerization initiator were mixed, and dissolved so as to be homogeneous (step II).

(Production of Monolith (Step III))

Next, the monolith intermediate was placed in a reaction container, immersed in the styrene/divinylbenzene/1-decanol/2,2'-azobis(2,4-dimethylvaleronitrile) mixture, and defoamed in a decompression chamber, and thereafter the reaction container was tightly sealed and polymerization was performed under still standing at 50° C. for 24 hours. After termination of the polymerization, the content was taken out and subjected to soxhlet extraction with acetone, and then dried under reduced pressure (step III).

Figure 11:
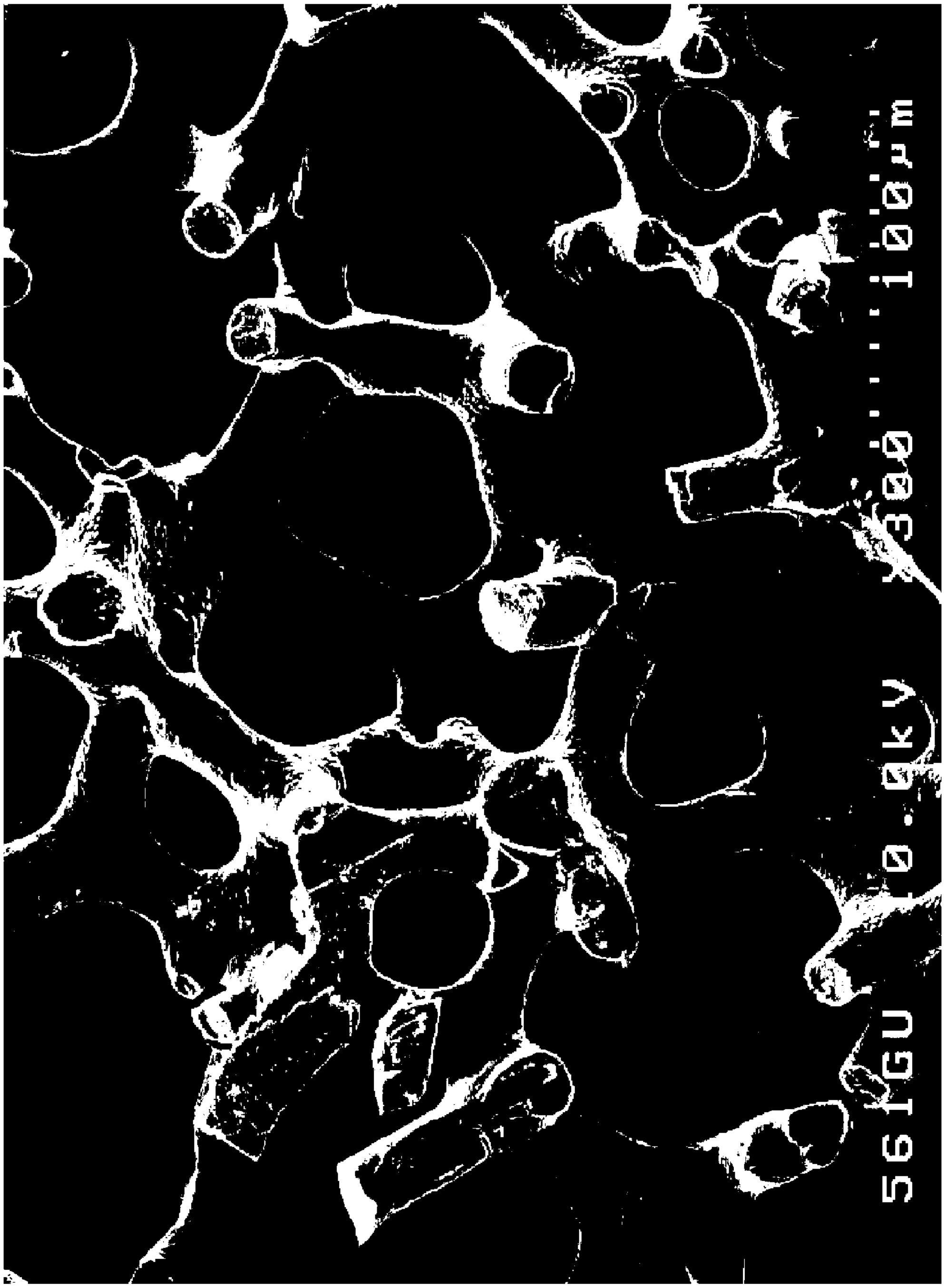
FIG. 11 An SEM photograph of a monolith obtained in Examples.

FIG. 11 illustrates the results of SEM observation of the internal structure of a monolith (dry body) thus obtained containing 1.2% by mol of a crosslinking component including a styrene/divinylbenzene-based copolymer. As is clear from FIG. 11, the monolith had a co-continuous structure including a continuous skeleton phase and a continuous hole phase, in which skeletons and holes were three-dimensionally continued and the two phases were entangled. The thickness of such a skeleton, measured from the SEM image, was 20 μm. The average diameter of three-dimensionally continued holes in the monolith was 70 μm and the total pore volume was 4.4 mL/g, as measured by a mercury intrusion technique. The average diameter of the holes was determined from the maximum value in a pore distribution curve obtained by a mercury intrusion technique.

(Production of Chloromethylated Monolith)

The monolith produced was placed in a columnar reactor, and a solution containing 1600 g of chlorosulfonic acid, 400 g of tin tetrachloride, and 2500 mL of dimethoxymethane was circulated and sent, to thereby perform reaction 30° C. for 5 hours and introduction of chloromethyl groups. After termination of the reaction, a chloromethylated monolith was washed with a mixed solvent of THF/water=2/1 (vol), and further washed with THE, to thereby obtain a chloromethylated monolith.

(Production of Weakly Basic Monolith Anion Exchanger)

Next, the chloromethylated monolith was dried under reduced pressure. The weight of the chloromethylated monolith after drying was 8.4 g. The chloromethylated monolith was placed in a separable flask in which a stirrer was placed, and a solution containing 56 mL of an aqueous 50% solution of dimethylamine as secondary amine, and 180 mL of THF was introduced into the separable flask under reflux, and stirred for 10 hours. After termination of the reaction, a product was washed with methanol and then washed with pure water, to obtain a weakly basic monolith anion exchanger.

The total anion exchange capacity of the weakly basic monolith anion exchanger obtained, in a dry state, was 4.7 mg equivalents/g, and the weak anion exchange capacity was 4.3 mg equivalents/g. The thickness of the continuous skeleton in a dry state, measured from the SEM image, was 25 μm.

(Production of Platinum Group Metal-Supported Catalyst (Pd Ion-Supported Weakly Basic Monolith Anion Exchanger))

Figure 12:
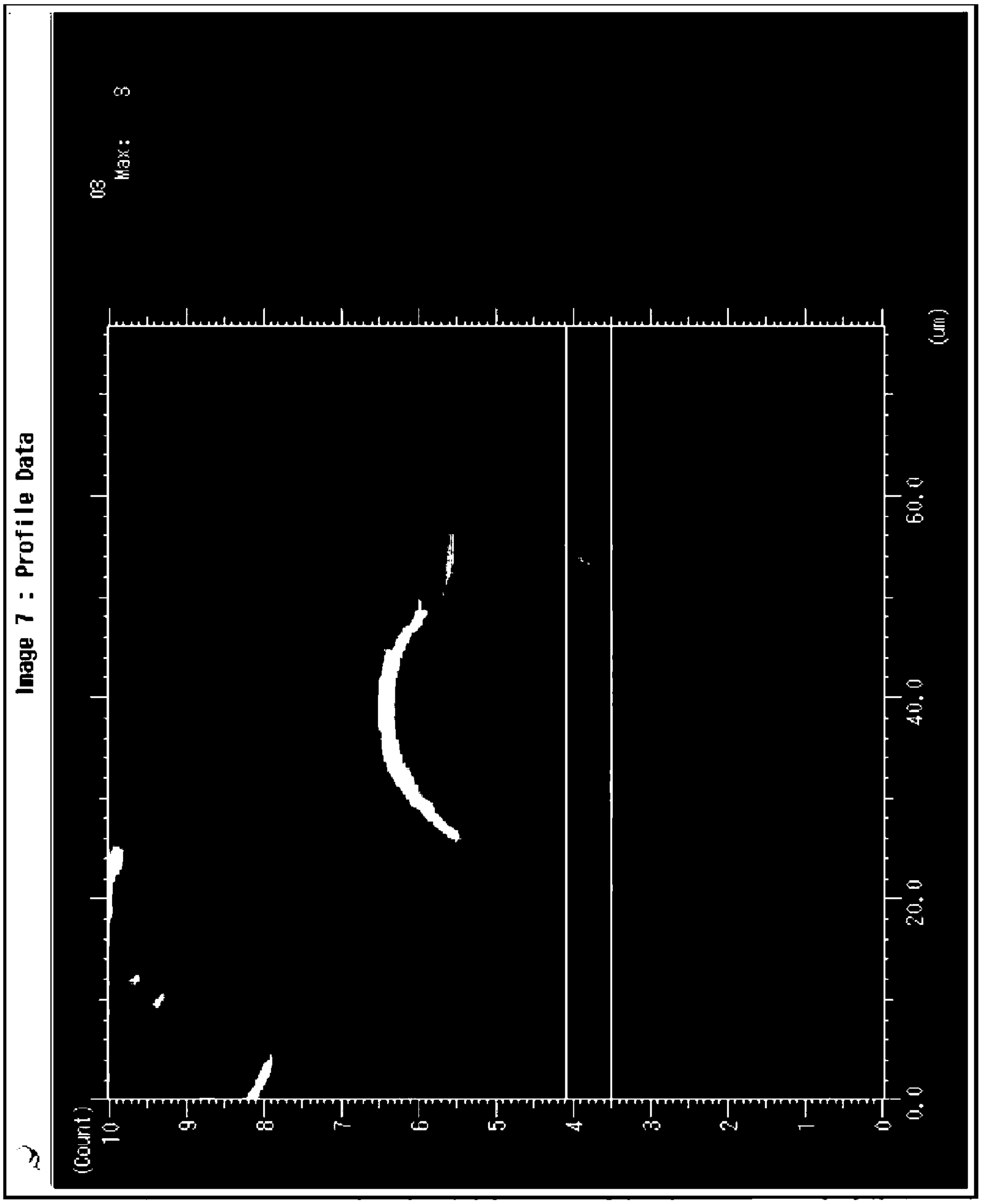
FIG. 12 An EPMA analysis result of a platinum group metal ion-supported catalyst obtained in Examples.
Figure 13:
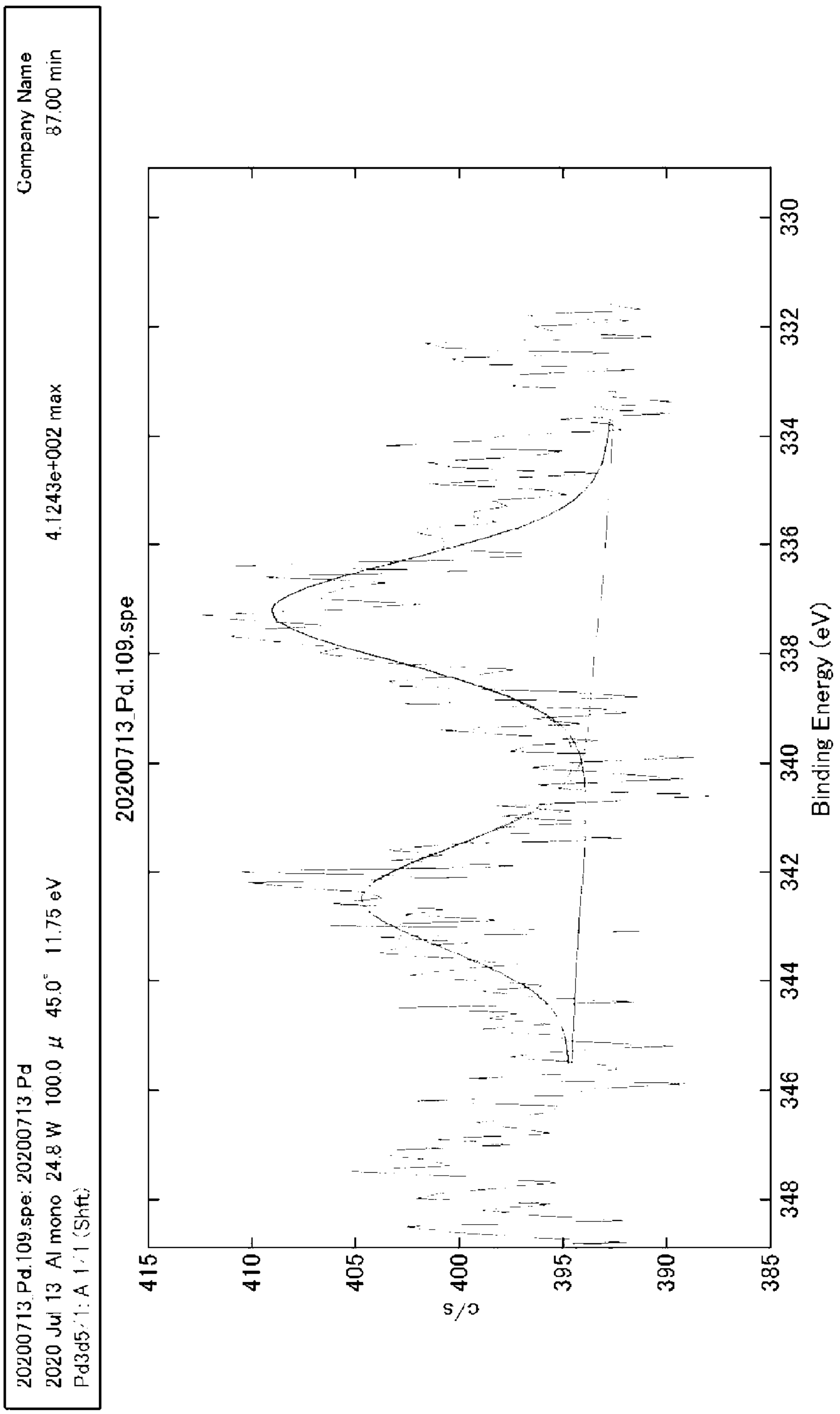
FIG. 13 A $Pd3d_{5/2}$ spectrum in ESCA analysis of a platinum group metal ion-supported catalyst obtained in Examples.

The weakly basic monolith anion exchanger was dried under reduced pressure. The weight of the weakly basic monolith anion exchanger after drying was 8.7 g. This monolith in a dry state was treated with hydrochloric acid in methanol, and then immersed in diluted hydrochloric acid in which 146 mg of palladium chloride was dissolved, for 24 hours, and tetrachloropalladate ions were attached. After termination of the immersion, a Pd ion-supported weakly basic monolith anion exchanger was prepared by washing with pure water several times. The amount of support of palladium in the Pd ion-supported weakly basic monolith anion exchanger obtained was determined by an ICP emission spectroscopic analysis apparatus (PS3520UVDDII manufactured by Hitachi High-Tech Science Corporation), and then the amount of support of palladium was 1.0% by weight. FIG. 12 and FIG. 13 respectively illustrate the analysis results of EPMA (Electron Probe Micro Analyzer) analysis and ESCA (Electron Spectroscopy for Chemical Analysis) analysis of the Pd ion-supported weakly basic monolith anion exchanger obtained.

(Production of Platinum Group Metal-Supported Catalyst (Pd Nanoparticle-Supported Weakly Basic Monolith Anion Exchanger))

Figure 14:
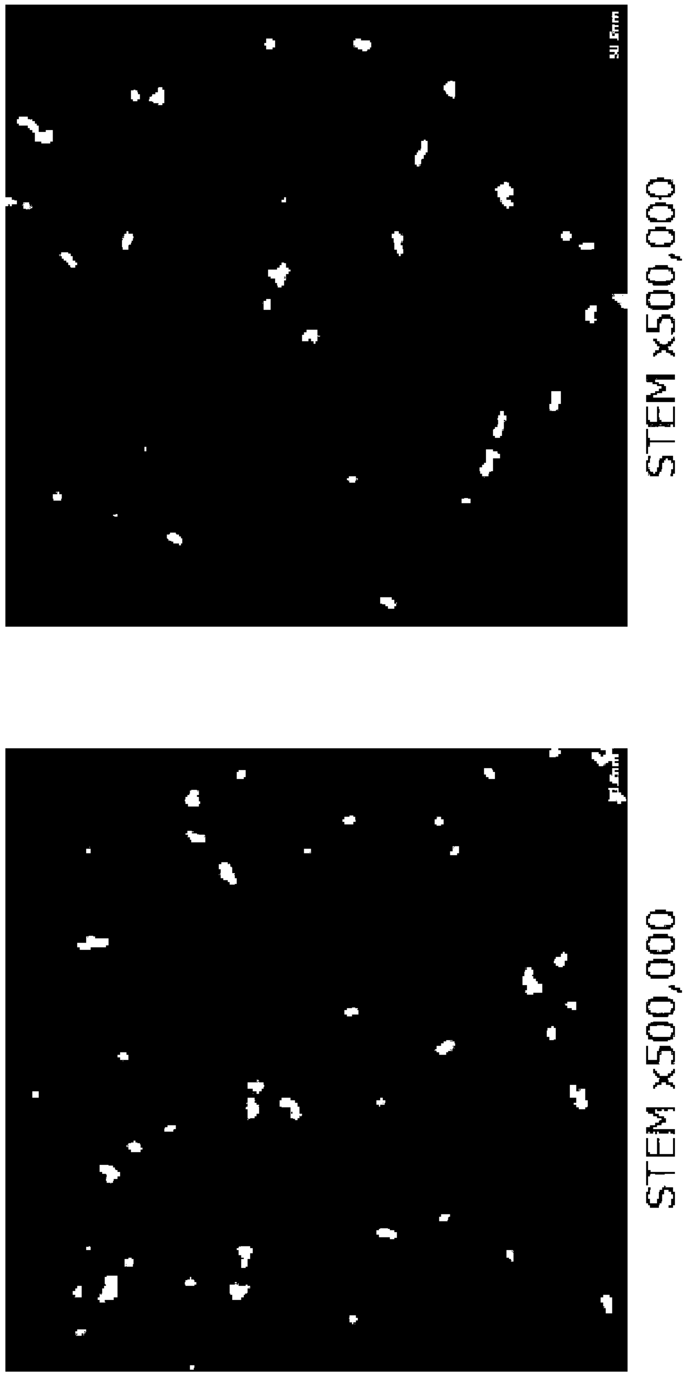
FIG. 14 TEM analysis results (left: first field of view, right: second field of view) of a platinum group metal-supported catalyst obtained in Examples.

A column was filled with the Pd ion-supported weakly basic monolith anion exchanger produced (size of catalyst cut out: 4.6 mm diameter×30 mm length (immersion in water)). The temperature of the column was 80° C. and the pressure was increased to 0.3 MPa by a back pressure valve, and toluene was fed at 0.5 mL/min at a flow velocity of hydrogen gas of 25 mL/min, to perform reduction of Pd ions. The Pd nanoparticle-supported weakly basic monolith anion exchanger obtained was dried under reduced pressure, and thereafter particle size analysis of Pd was performed with TEM analysis. FIG. 14 illustrates the analysis results of TEM.

(Production of Platinum Group Metal-Supported Catalyst (Pt Ion-Supported Weakly Basic Monolith Anion Exchanger))

Figure 15:
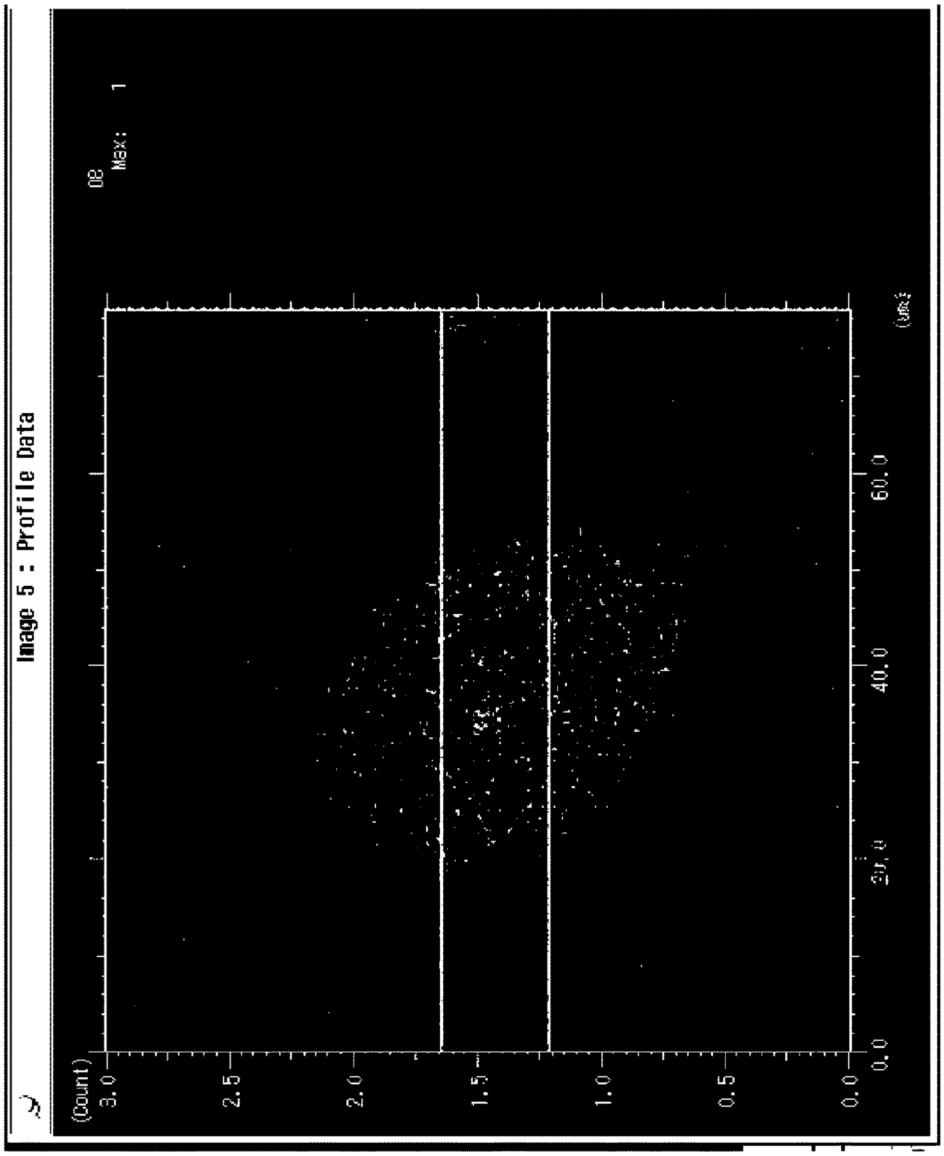
FIG. 15 An EPMA analysis result of a platinum group metal-supported catalyst obtained in Examples.

The weakly basic monolith anion exchanger produced was dried under reduced pressure. The weight of the weakly basic monolith anion exchanger after drying was 6.7 g. This weakly basic monolith anion exchanger in a dry state was placed in a separable flask in which a stirrer was placed, and was immersed in a 1 N hydrochloric acid/methanol solution and stirred at room temperature (25±2° C.) for one day. Thereafter, the weakly basic monolith anion exchanger treated with hydrochloric acid was immersed in 150 mL of a solution of 0.142 g of potassium(II) chloroplatinate, and stirred at room temperature (25±2° C.) for one day, to support platinum ions on the weakly basic monolith anion exchanger. The Pt ion-supported weakly basic monolith anion exchanger obtained was washed with pure water several times, and thereafter dried under reduced pressure. The amount of support of palladium in the Pt ion-supported weakly basic monolith anion exchanger obtained was determined by an ICP emission spectroscopic analysis apparatus (PS3520UVDDII manufactured by Hitachi High-Tech Science Corporation), and then the amount of support of platinum was 0.57% by weight. The distribution state of platinum was observed with EPMA (Electron Probe Micro Analyzer). FIG. 15 illustrates the distribution state of platinum in a skeleton cross section of the Pt ion-supported weakly basic monolith anion exchanger. Platinum was confirmed to be distributed not only in the skeleton surface, but also in the skeleton internal area, of the weakly basic monolith anion exchanger, and relatively uniformly distributed, while distributed in the internal area at a slightly higher concentration.

(Production of Powdery Palladium-Supported Catalyst)

The platinum group metal-supported catalyst (Pd nanoparticle-supported weakly basic monolith anion exchanger) prepared was pulverized by a mortar, to thereby produce 1.0% by weight of a powdery Pd-supported catalyst.

(Production of Pd Nanoparticle-Supported Strongly Basic Monolith Anion Exchanger)

A Pd nanoparticle-supported strongly basic monolith anion exchanger was produced based on JP 2014-030821 A.

(Production of Pd Nanoparticle-Supported Strongly Acidic Monolith Cation Exchanger)

A Pd nanoparticle-supported strongly acidic monolith cation exchanger was produced based on JP 2014-030821 A.

[Catalytic Hydrogenation Reduction in Continuous Flow System (Circulation System)]

Example 1-1: Hydrogenation Reduction Reaction of Diphenylacetylene

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution in which 6.0 mmol of diphenylacetylene was dissolved in 20 mL of ethanol was prepared, and fed at a flow velocity of the substrate solution of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 1,2-diphenylethane, and the conversion into 1,2-diphenylethane after 3 h from the reaction was calculated by GC (GC-2010Plus manufactured by Shimadzu Corporation) analysis, and thus was 94%. Each conversion was calculated by GC analysis also in the following Examples and Comparative Examples.

Example 1-2: Hydrogenation Reduction Reaction of Diphenylacetylene

The reaction was performed by the same method as in Example 1-1 except that the column temperature was changed from 80° C. to 60° C. and the pressure was changed from 0.3 MPa to atmospheric pressure. The reaction product was 1,2-diphenylethane, and the conversion into 1,2-diphenylethane after 3 h from the reaction was 95%.

Comparative Example 1-1: Hydrogenation Reduction Reaction of Diphenylacetylene The reaction was performed by the same method as in Example 1-1, except that the catalyst used was changed from the Pd ion-supported weakly basic monolith anion exchanger where the amount of support of palladium was 1.0% by weight to a Pd ion-supported strongly basic monolith anion exchanger where the amount of support of palladium was 1.0% by weight. The reaction product was 1,2-diphenylethane, and the conversion was 70%.

Example 1-3: Hydrogenation Reduction Reaction of 2-Nitrobiphenyl

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution in which 6.0 mmol of 2-nitrobiphenyl was dissolved in 20 mL of ethanol was prepared, and fed at a flow velocity of the substrate solution, of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 2-aminobiphenyl, and the conversion into 2-aminobiphenyl after 3 h from the reaction was 56%.

Example 1-4: Hydrogenation Reduction Reaction of 2-Nitrobiphenyl

The reaction was performed by the same method as in Example 1-3, except that the column temperature was changed from 80° C. to 60° C. and the pressure was changed from 0.3 MPa to atmospheric pressure. The reaction product was 2-aminobiphenyl, and the conversion was 45%.

Comparative Example 1-2: Hydrogenation Reduction Reaction of 2-Nitrobiphenyl The reaction was performed by the same method as in Example 1-3, except that the catalyst used was changed from the Pd ion-supported weakly basic monolith anion exchanger where the amount of support of palladium was 1.0% by weight to a Pd nanoparticle-supported strongly basic monolith anion exchanger where the amount of support of palladium was 1.0% by weight. The reaction product was 2-aminobiphenyl, and the conversion was 11%.

Comparative Example 1-3: Hydrogenation Reduction Reaction of 2-Nitrobiphenyl The reaction was performed by the same method as in Example 1-3, except that the catalyst used was changed from the Pd ion-supported weakly basic monolith anion exchanger where the amount of support of palladium was 1.0% by weight to a Pd nanoparticle-supported strongly acidic monolith cation exchanger where the amount of support of palladium was 1.0% by weight. The reaction product was 2-aminobiphenyl, and the conversion into 2-aminobiphenyl after 3 h from the reaction was 20%.

Example 1-5: Hydrogenation Reduction Reaction of 1-Carbobenzoxypiperazine

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution in which 6.0 mmol of 1-carbobenzoxypiperazine was dissolved in 20 mL of ethanol was prepared, and fed at a flow velocity of the substrate solution of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was piperazine, and the conversion into piperazine after 3 h from the reaction was 69%.

Example 1-6: Hydrogenation Reduction Reaction of 1-Carbobenzoxypiperazine

The reaction was performed by the same method as in Example 1-5, except that the column temperature was changed from 80° C. to 60° C. and the pressure was changed from 0.3 MPa to atmospheric pressure. The reaction product was piperazine, and the conversion was 95%.

Comparative Example 1-4: Hydrogenation Reduction Reaction of 1-Carbobenzoxypiperazine The reaction was performed by the same method as in Example 1-5, except that the catalyst used was changed from the Pd ion-supported weakly basic monolith anion exchanger where the amount of support of palladium was 1.0% by weight to a Pd nanoparticle-supported strongly basic monolith anion exchanger where the amount of support of palladium was 1.0% by weight. The reaction product was piperazine, and the conversion was 23%.

Comparative Example 1-5: Hydrogenation Reduction Reaction of 1-Carbobenzoxypiperazine The reaction was performed by the same method as in Example 1-5, except that the catalyst used was changed from the Pd ion-supported weakly basic monolith anion exchanger where the amount of support of palladium was 1.0% by weight to a Pd nanoparticle-supported strongly acidic monolith cation exchanger where the amount of support of palladium was 1.0% by weight. The reaction product was piperazine, and the conversion was 0%.

Example 1-7: Hydrogenation Reduction Reaction of Benzyl Benzoate

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution in which 6.0 mmol of benzyl benzoate was dissolved in 20 mL of ethanol was prepared, and fed at a flow velocity of the substrate solution of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was benzoic acid, and the conversion into benzoic acid after 3 h from the reaction was 96%.

Example 1-8: Hydrogenation Reduction Reaction of Benzyl Benzoate

The reaction was performed by the same method as in Example 1-7, except that the column temperature was changed from 80° C. to 60° C. and the pressure was changed from 0.3 MPa to atmospheric pressure. The reaction product was benzoic acid, and the conversion was 82%.

Example 1-9: Hydrogenation Reduction Reaction of Acetophenone

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution in which 6.0 mmol of acetophenone was dissolved in 20 mL of ethanol was prepared, and fed at a flow velocity of the substrate solution, of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 1-phenylethanol, and the conversion into 1-phenylethanol after 3 h from the reaction was 15%.

Example 1-10: Hydrogenation Reduction Reaction of Acetophenone

The reaction was performed by the same method as in Example 1-9, except that the column temperature was changed from 80° C. to 60° C. and the pressure was changed from 0.3 MPa to atmospheric pressure. The reaction product was 1-phenylethanol, and the conversion was 8%.

Comparative Example 1-6: Hydrogenation Reduction Reaction of Acetophenone

The reaction was performed by the same method as in Example 1-9, except that the catalyst used was changed from the Pd ion-supported weakly basic monolith anion exchanger where the amount of support of palladium was 1.0% by weight to a Pd nanoparticle-supported strongly basic monolith anion exchanger where the amount of support of palladium was 1.0% by weight, but no reaction occurred.

(Example 1-11: Hydrogenation Reduction Reaction of 4-(benzyloxy)phenol)

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution in which 6.0 mmol of 4-(benzyloxy)phenol was dissolved in 20 mL of ethanol was prepared, and fed at a flow velocity of the substrate solution of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was hydroquinone, and the conversion into hydroquinone after 3 h from the reaction was 82%.

TABLE 1

| | Reaction system | Metal species | Carrier | Amount of support of metal (% by weight) | Amount of catalyst | Substrate |
|---|---|---|---|---|---|---|
| Example 1-1 | Continuous circulation | Pd | Weakly basic | 1.0 | Φ4.6 mm × 30 mm | Diphenylacetylene |
| Example 1-2 | Continuous circulation | Pd | Weakly basic | 1.0 | Φ4.6 mm × 30 mm | Diphenylacetylene |
| Comparative Example 1-1 | Continuous circulation | Pd | Strongly basic | 1.0 | Φ4.6 mm × 30 mm | Diphenylacetylene |
| Example 1-3 | Continuous circulation | Pd | Weakly basic | 1.0 | Φ4.6 mm × 30 mm | 2-Nitrobiphenyl |
| Example 1-4 | Continuous circulation | Pd | Weakly basic | 1.0 | Φ4.6 mm × 30 mm | 2-Nitrobiphenyl |
| Comparative Example 1-2 | Continuous circulation | Pd | Strongly basic | 1.0 | Φ4.6 mm × 30 mm | 2-Nitrobiphenyl |
| Comparative Example 1-3 | Continuous circulation | Pd | Strongly acidic | 1.0 | Φ4.6 mm × 30 mm | 2-Nitrobiphenyl |
| Example 1-5 | Continuous circulation | Pd | Weakly basic | 1.0 | Φ4.6 mm × 30 mm | 1-Carbobenzoxypiperazine |
| Example 1-6 | Continuous circulation | Pd | Weakly basic | 1.0 | Φ4.6 mm × 30 mm | 1-Carbobenzoxypiperazine |
| Comparative Example 1-4 | Continuous circulation | Pd | Strongly basic | 1.0 | Φ4.6 mm × 30 mm | 1-Carbobenzoxypiperazine |
| Comparative Example 1-5 | Continuous circulation | Pd | Strongly acidic | 1.0 | Φ4.6 mm × 30 mm | 1-Carbobenzoxypiperazine |
| Example 1-7 | Continuous circulation | Pd | Weakly basic | 1.0 | Φ4.6 mm × 30 mm | Benzyl benzoate |
| Example 1-8 | Continuous circulation | Pd | Weakly basic | 1.0 | Φ4.6 mm × 30 mm | Benzyl benzoate |
| Example 1-9 | Continuous circulation | Pd | Weakly basic | 1.0 | Φ4.6 mm × 30 mm | Acetophenone |
| Example 1-10 | Continuous circulation | Pd | Weakly basic | 1.0 | Φ4.6 mm × 30 mm | Acetophenone |
| Comparative Example 1-6 | Continuous circulation | Pd | Strongly basic | 1.0 | Φ4.6 mm × 30 mm | Acetophenone |
| Example 1-11 | Continuous circulation | Pd | Weakly basic | 1.0 | Φ4.6 mm × 30 mm | 4-(Benzyloxy)phenol |

| | Concentration of substrate (mol/L) | Solvent | Flow rate of solution (mL/min) | Flow rate of hydrogen (mL/min) | Temperature (°C) | Pressure (MPa) | Conversion after 3 h (%) |
|---|---|---|---|---|---|---|---|
| Example 1-1 | 0.3 | Ethanol | 0.5 | 10 | 80 | 0.3 | 94 |
| Example 1-2 | 0.3 | Ethanol | 0.5 | 10 | 60 | Atmospheric pressure | 95 |
| Comparative Example 1-1 | 0.3 | Ethanol | 0.5 | 10 | 80 | 0.3 | 70 |
| Example 1-3 | 0.3 | Ethanol | 0.5 | 10 | 80 | 0.3 | 56 |
| Example 1-4 | 0.3 | Ethanol | 0.5 | 10 | 60 | Atmospheric pressure | 45 |
| Comparative Example 1-2 | 0.3 | Ethanol | 0.5 | 10 | 80 | 0.3 | 11 |
| Comparative Example 1-3 | 0.3 | Ethanol | 0.5 | 10 | 60 | 0.3 | 20 |
| Example 1-5 | 0.3 | Ethanol | 0.5 | 10 | 80 | 0.3 | 69 |
| Example 1-6 | 0.3 | Ethanol | 0.5 | 10 | 60 | Atmospheric pressure | 95 |
| Comparative Example 1-4 | 0.3 | Ethanol | 0.5 | 10 | 80 | 0.3 | 23 |
| Comparative Example 1-5 | 0.3 | Ethanol | 0.5 | 10 | 80 | 0.3 | 0 |
| Example 1-7 | 0.3 | Ethanol | 0.5 | 10 | 80 | 0.3 | 96 |
| Example 1-8 | 0.3 | Ethanol | 0.5 | 10 | 60 | Atmospheric pressure | 82 |
| Example 1-9 | 0.3 | Ethanol | 0.5 | 10 | 80 | 0.3 | 15 |
| Example 1-10 | 0.3 | Ethanol | 0.5 | 10 | 60 | Atmospheric pressure | 8 |

TABLE 1-continued

| | | | | | | | |
|---|---|---|---|---|---|---|---|
| Comparative Example 1-6 | 0.3 | Ethanol | 0.5 | 10 | 80 | 0.3 | 0 |
| Example 1-11 | 0.3 | Ethanol | 0.5 | 10 | 80 | 0.3 | 82 |

It was revealed from the results in Table 1 that the catalyst with the weakly basic monolith anion exchanger as the carrier had the highest hydrogenation reduction activity in the case of use of any substrate.

[Catalytic Hydrogenation Reduction in Continuous Flow System]

Example 2-1: Hydrogenation Reduction Reaction of Diphenylacetylene

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution was prepared so that 0.3 mol/L of diphenylacetylene was in an ethanol solution, and fed at a flow velocity of the substrate solution of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction products were 1,2-diphenylethane and cis-stilbene, and the respective proportions of 1,2-diphenylethane and cis-stilbene after 2 h from liquid sending were 99% and 1%. The conversion was 100%.

Example 2-2: Hydrogenation Reduction Reaction of 2-Nitrobiphenyl

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution was prepared so that 0.3 mol/L of 2-nitrobiphenyl was in an ethanol solution, and fed at a flow velocity of the substrate solution of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 2-aminobiphenyl, and the conversion after 2 h from liquid sending was 56%.

Example 2-3: Hydrogenation Reduction Reaction of 2-Nitrobiphenyl

The reaction was performed by the same method as in Example 2-2, except that the catalyst used was changed from the Pd ion-supported weakly basic monolith anion exchanger where the amount of support of palladium was 1.0% by weight (size of catalyst cut out: 4.6 mm diameter×30 mm length (immersion in water)) to a Pd ion-supported weakly basic monolith anion exchanger where the amount of support of palladium was 0.2% by weight (size of catalyst cut out: 4.6 mm diameter×150 mm length (immersion in water)), and the flow velocity of hydrogen gas was changed from 10 mL/min to 25 mL/min. The reaction product was 2-aminobiphenyl, and the conversion was 100%.

Example 2-4: Hydrogenation Reduction Reaction of 2-Nitrobiphenyl

The reaction was performed by the same method as in Example 2-2, except that the column temperature was changed from 80° C. to 60° C. and the pressure was changed from 0.3 MPa to atmospheric pressure. The reaction product was 2-aminobiphenyl, and the conversion was 88%.

Example 2-5: Hydrogenation Reduction Reaction of 1-Carbobenzoxypiperazine

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution was prepared so that 0.3 mol/L of 1-carbobenzoxypiperazine was in an ethanol solution, and fed at a flow velocity of the substrate solution of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was piperazine, and the conversion after 2 h from liquid sending was 61%.

Example 2-6: Hydrogenation Reduction Reaction of 1-Carbobenzoxypiperazine

The reaction was performed by the same method as in Example 2-2, except that the column temperature was changed from 80° C. to 60° C. and the pressure was changed from 0.3 MPa to atmospheric pressure. The reaction product was piperazine, and the conversion was 82%.

Example 2-7: Hydrogenation Reduction Reaction of Acetophenone

A cylindrical column made of a resin was filled with a Pd ion-supported weakly basic monolith anion exchanger where the amount of support of palladium was 10.0% by weight (size of catalyst cut out: 4.6 mm diameter×30 mm length (immersion in water)). A substrate solution was prepared so that 0.3 mol/L of acetophenone was in an ethanol solution, and fed at a flow velocity of the substrate solution of 0.5 mL/min, and a flow velocity of hydrogen gas of 10 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 1-phenylethanol, and the conversion after 2 h from liquid sending was 11%.

Example 2-8: Hydrogenation Reduction Reaction of Nitrobenzene

A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution was prepared so that 0.3 mol/L of nitrobenzene was in a toluene solution, and the column was filled with the Pd ion-supported weakly basic monolith anion exchanger where the amount of support of palladium was 1.0% by weight (size of catalyst cut out: 4.6 mm diameter×30 mm length (immersion in water)). The substrate solution was fed at a flow velocity of the substrate solution of 0.5 mL/min, and a flow velocity of hydrogen gas of 25 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was aniline, and the conversion after 2 h from liquid sending was 97%.

Example 2-9: Hydrogenation Reduction Reaction of Nitrobenzene

The reaction was performed by the same method as in Example 2-8, except that the solvent was changed from toluene to ethyl acetate. The reaction product was aniline, and the conversion was 98%.

Example 2-10: Hydrogenation Reduction Reaction of Nitrobenzene

The reaction was performed by the same method as in Example 2-8, except that the solvent was changed from toluene to THF. The reaction product was aniline, and the conversion was 100%.

Example 2-11: Hydrogenation Reduction Reaction of Nitrobenzene

The reaction was performed by the same method as in Example 2-8, except that the catalyst used was changed from the Pd ion-supported weakly basic monolith anion exchanger where the amount of support of palladium was 1.0% by weight (size of catalyst cut out: 4.6 mm diameter×30 mm length (immersion in water)) to a Pt ion-supported weakly basic monolith anion exchanger where the amount of support of platinum was 1.0% by weight (size of catalyst cut out: 4.6 mm diameter×30 mm length (immersion in water)), and the solvent was changed from toluene to ethanol. The reaction product was aniline, and the conversion was 83%.

TABLE 2

| | Reaction system | Metal species | Type of carrier | Amount of support of metal (% by weight) | Amount of catalyst | Substrate |
|---|---|---|---|---|---|---|
| Example 2-1 | Continuous flow | Pd | Weakly basic | 1.0 | Φ4.6 mm × 30 mm | Diphenylacetylene |
| Example 2-2 | Continuous flow | Pd | Weakly basic | 1.0 | Φ4.6 mm × 30 mm | 2-Nitrobiphenyl |
| Example 2-3 | Continuous flow | Pd | Weakly basic | 0.2 | Φ4.6 mm × 150 mm | 2-Nitrobiphenyl |
| Example 2-4 | Continuous flow | Pd | Weakly basic | 1.0 | Φ4.6 mm × 30 mm | 2-Nitrobiphenyl |
| Example 2-5 | Continuous flow | Pd | Weakly basic | 1.0 | Φ4.6 mm × 30 mm | 1-Carbobenzoxypiperazine |
| Example 2-6 | Continuous flow | Pd | Weakly basic | 1.0 | Φ4.6 mm × 30 mm | 1-Carbobenzoxypiperazine |
| Example 2-7 | Continuous flow | Pd | Weakly basic | 10.0 | Φ4.6 mm × 30 mm | Acetophenone |
| Example 2-8 | Continuous flow | Pd | Weakly basic | 1.0 | Φ4.6 mm × 30 mm | Nitrobenzene |
| Example 2-9 | Continuous flow | Pd | Weakly basic | 1.0 | Φ4.6 mm × 30 mm | Nitrobenzene |
| Example 2-10 | Continuous flow | Pd | Weakly basic | 1.0 | Φ4.6 mm × 30 mm | Nitrobenzene |
| Example 2-11 | Continuous flow | Pt | Weakly basic | 0.57 | Φ4.6 mm × 30 mm | Nitrobenzene |

| | Concentration of substrate (mol/L) | Solvent | Flow rate of solution (mL/min) | Flow rate of hydrogen (mL/min) | Temperature (°C) | Pressure (MPa) | Conversion after 2 h (%) |
|---|---|---|---|---|---|---|---|
| Example 2-1 | 0.3 | Ethanol | 0.5 | 10 | 80 | 0.3 | 100 |
| Example 2-2 | 0.3 | Ethanol | 0.5 | 10 | 80 | 0.3 | 56 |
| Example 2-3 | 0.3 | Ethanol | 0.5 | 25 | 80 | 0.3 | 100 |
| Example 2-4 | 0.3 | Ethanol | 0.5 | 10 | 60 | Atmospheric pressure | 88 |
| Example 2-5 | 0.3 | Ethanol | 0.5 | 10 | 80 | 0.3 | 61 |
| Example 2-6 | 0.3 | Ethanol | 0.5 | 10 | 60 | Atmospheric pressure | 82 |
| Example 2-7 | 0.3 | Ethanol | 0.5 | 10 | 80 | 0.3 | 11 |
| Example 2-8 | 0.3 | Toluene | 0.5 | 25 | 80 | 0.3 | 97 |

TABLE 2-continued

| | | | | | | | |
|---|---|---|---|---|---|---|---|
| Example 2-9 | 0.3 | Ethyl acetate | 0.5 | 25 | 80 | 0.3 | 98 |
| Example 2-10 | 0.3 | THF | 0.5 | 25 | 80 | 0.3 | 100 |
| Example 2-11 | 0.3 | Ethanol | 0.5 | 25 | 80 | 0.3 | 83 |

It was revealed from Table 2 that favorable hydrogenation reduction activity was exhibited even when the amount of the catalyst and the amount of support of a noble metal, the solvent, the temperature, the pressure, and the flow rate of hydrogen were changed.

[Catalytic Hydrogenation Reduction in Batch System]

Example 3-1: Hydrogenation Reduction Reaction of Acetophenone

To a pressure container were added 0.24 g (2 mmol) of acetophenone and 6.7 mL of ethanol. Next, 1.0% by weight of the powdery Pd-supported catalyst prepared above was added in an amount of 33 mg corresponding to 0.16% by mol of palladium relative to the reaction substrate, hydrogen gas was enclosed at 0.3 MPa into a pressure container, and reaction was made at 80° C. for 3 hours. The reaction product was 1-phenylethanol, and the conversion was 10%.

Example 3-2: Deprotection Reaction of 1-Carbobenzoxypiperazine

The reaction was performed by the same method as in Example 3-1, except that a substrate solution in which 0.44 g (2 mmol) of 1-carbobenzoxypiperazine was dissolved in 6.7 mL of methanol was adopted instead of the substrate solution in which 2 mmol of acetophenone was dissolved in 6.7 mL of methanol. The reaction product was piperazine, and the conversion was 100%.

Example 3-3: Hydrogenation Reduction Reaction of 2-Nitrobiphenyl

The reaction was performed by the same method as in Example 3-1, except that a substrate solution in which 0.40 g (2 mmol) of 2-nitrobiphenyl was dissolved in 6.7 mL of methanol was adopted instead of the substrate solution in which 2 mmol of acetophenone was dissolved in 6.7 mL of methanol. The reaction product was 2-aminobiphenyl, and the conversion was 24%.

Example 3-4: Hydrogenation Reduction Reaction of Benzyl Benzoate

The reaction was performed by the same method as in Example 3-1, except that a substrate solution in which 0.42 g (2 mmol) of benzyl benzoate was dissolved in 6.7 mL of methanol was adopted instead of the substrate solution in which 2 mmol of acetophenone was dissolved in 6.7 mL of methanol. The reaction product was benzoic acid, and the conversion was 100%.

Example 3-5: Hydrogenation Reduction Reaction of Diphenylacetylene

Hydrogenation reduction reaction of diphenylacetylene was performed. Into 20 mL of ethanol was added 0.36 g (2 mmol) of diphenylacetylene, 1.0% by weight of the powdery Pd-supported catalyst was added in an amount of 100 mg corresponding to 0.16% by mol of palladium relative to the reaction substrate, hydrogen gas was fed from a balloon, and the reaction was performed at atmospheric pressure and 60° C. for 2 hours. The reaction products were 1,2-diphenylethane and stilbene, and the respective proportions of 1,2-diphenylethane and stilbene were 97% and 3%.

TABLE 3

| | Reaction system | Metal species | Amount of support of metal (% by weight) | Amount of catalyst (mg) | Substrate | Substrate (mmol) | Solvent | Temperature (°C) | Pressure (MPa) | Conversion after 3 h (%) |
|---|---|---|---|---|---|---|---|---|---|---|
| Example 3-1 | Batch system | Pd | 1.0 | 33 | Acetophenone | 2 | Ethanol | 80 | 0.3 | 10 |
| Example 3-2 | Batch system | Pd | 1.0 | 33 | 1-Carbobenzoxypiperazine | 2 | Ethanol | 80 | 0.3 | 100 |
| Example 3-3 | Batch system | Pd | 1.0 | 33 | 2-Nitrobiphenyl | 2 | Ethanol | 80 | 0.3 | 24 |
| Example 3-4 | Batch system | Pd | 1.0 | 33 | Benzyl benzoate | 2 | Ethanol | 80 | 0.3 | 100 |
| Example 3-5 | Batch system | Pd | 1.0 | 100 | Diphenylacetylene | 2 | Ethanol | 60 | Atmospheric pressure | 100 |

It was revealed from Table 3 that favorable hydrogenation reduction activity was exhibited not only in the reaction in the flow system, but also in the reaction in the batch system.

[Catalytic Hydrogenation Reduction of Nitrobenzene by Continuous Running for Long Time]

Example 4-1: Hydrogenation Reduction Reaction of Nitrobenzene by Use of Pt Catalyst A cylindrical column made of a resin was filled with a Pt ion-supported weakly basic monolith anion exchanger where the amount of support of platinum was 0.57% by weight (size of catalyst cut out: 4.6 mm diameter×30 mm length (immersion in water)). Next, a substrate solution was prepared so that 0.3 mol/L of nitrobenzene was in an ethanol solution, and fed at a flow velocity of the substrate solution, of 0.5 mL/min, and a flow velocity of hydrogen gas of 25 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The amount of sending of the 0.3 mol/L nitrobenzene/ethanol solution after 24 h from liquid sending was 720 mL. The reaction product was aniline, and the total conversion into aniline after 24 h from liquid sending was 90%. The TON (number of catalyst rotations) was here about 67000.

Figure 16:
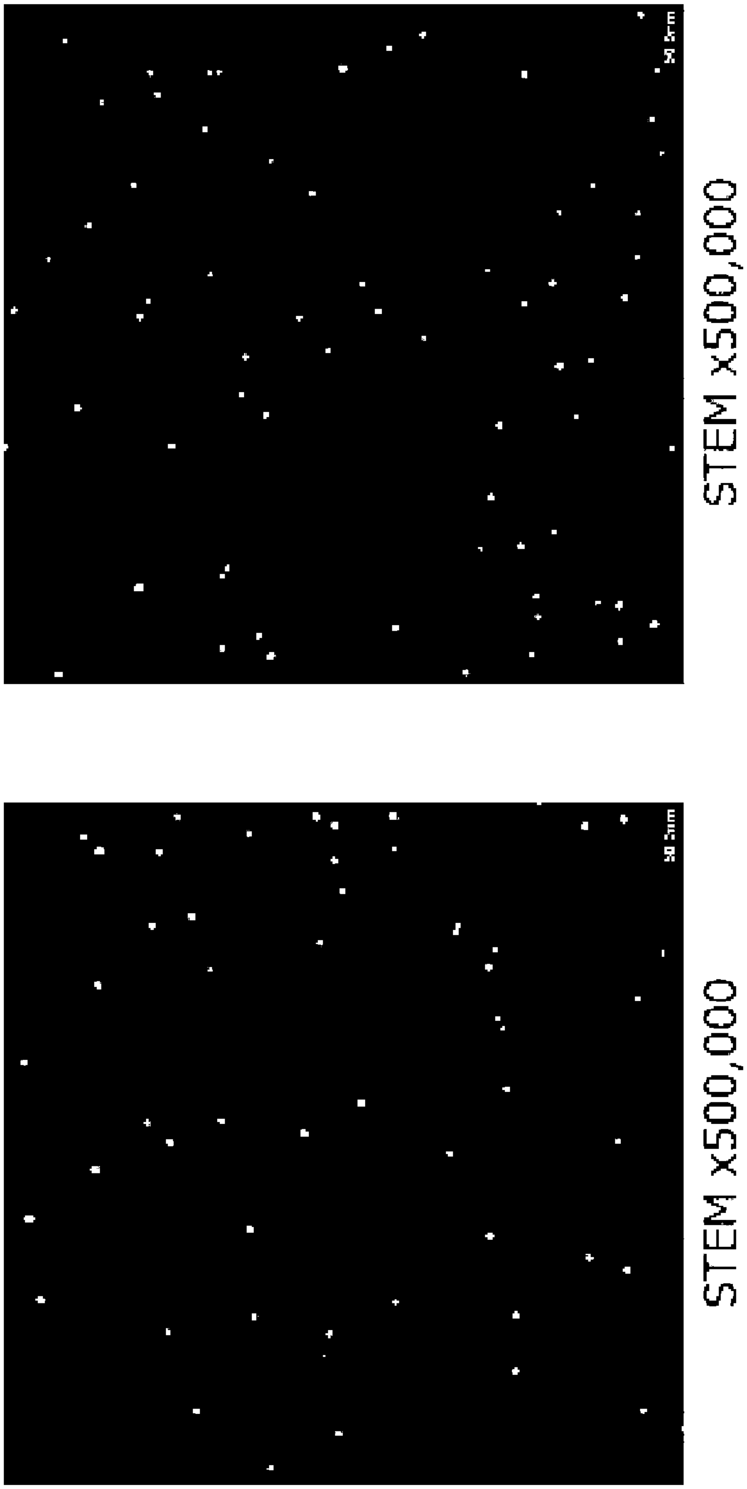
FIG. 16 TEM analysis results (left: first field of view, right: second field of view) of a platinum group metal ion-supported catalyst after use in Example 4-2.

Example 4-2: Hydrogenation Reduction Reaction of Nitrobenzene by Use of Pt Catalyst A cylindrical column made of a resin was filled with a Pt ion-supported weakly basic monolith anion exchanger where the amount of support of platinum was 0.57% by weight (size of catalyst cut out: diameter 6.0 mm×90 mm length (immersion in water)). Next, a substrate solution was prepared so that 0.2 mol/L of nitrobenzene was in an ethanol solution, and fed at a flow velocity of the substrate solution of 0.2 mL/min, and a flow velocity of hydrogen gas of 7 mL/min at a temperature of the column of 80° C. and at a pressure increased to 0.3 MPa by a back pressure valve, to perform hydrogenation reduction reaction. Here, the SV of the substrate solution was 8 $h^{-1}$. The time during which the substrate solution and the catalyst layer were contacted was 7.5 minutes in total. The amount of sending of the 0.2 mol/L nitrobenzene/ethanol solution after 24 h from liquid sending was 288 mL. The reaction product was aniline, and the total conversion into aniline after 24 h from liquid sending was 100%. The TON (number of catalyst rotations) was here about 2200. The Pt ion-supported weakly basic monolith anion exchanger after use was washed with ethanol, dried under reduced pressure, and then subjected to particle size analysis of Pt with TEM analysis. FIG. 16 illustrates the analysis results.

Example 4-3: Hydrogenation Reduction Reaction of Nitrobenzene by Use of Pd Catalyst A cylindrical column made of a resin was filled with the Pd ion-supported weakly basic monolith anion exchanger where the amount of support of palladium was 1.0% by weight (size of catalyst cut out: 4.6 mm diameter×30 mm length (immersion in water)). Next, a substrate solution was prepared so that 0.3 mol/L of nitrobenzene was in a toluene solution, and fed at a flow velocity of the substrate solution, of 0.5 mL/min, and a flow velocity of hydrogen gas of 25 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The amount of sending of the 0.3 mol/L nitrobenzene/toluene solution after 20 h from liquid sending was 600 mL. The reaction product was aniline, and the total conversion into aniline after 20 h from liquid sending was 100%. The TON (number of catalyst rotations) was here about 19000.

TABLE 4

| | Reaction system | Metal species | Amount of support of metal (% by weight) | Amount of catalyst | Substrate | Concentration of substrate (mol/L) |
|---|---|---|---|---|---|---|
| Example 4-1 | Continuous flow | Pt | 0.57 | Φ4.6 mm × 30 mm | Nitrobenzene | 0.3 |
| Example 4-2 | Continuous flow | Pt | 0.57 | Φ6.0 mm × 90 mm | Nitrobenzene | 0.2 |
| Example 4-3 | Continuous flow | Pd | 1.0 | Φ4.6 mm × 30 mm | Nitrobenzene | 0.3 |

| | Solvent | Flow rate of solution (mL/min) | Flow rate of hydrogen (mL/min) | Temperature (°C) | Pressure (MPa) | Total conversion (%) | Note |
|---|---|---|---|---|---|---|---|
| Example 4-1 | Ethanol | 0.5 | 25 | 80 | 0.3 | 90 | Total conversion after 24 h is described |
| Example 4-2 | Ethanol | 0.2 | 7 | 80 | 0.3 | 100 | Total conversion after 24 h is described |
| Example 4-3 | Toluene | 0.5 | 25 | 80 | 0.3 | 100 | Total conversion after 20 h is described |

It was revealed from Table 4 that, even if hydrogenation reduction reaction was performed for a long time, favorable hydrogenation reduction activity was exhibited without deterioration in catalyst activity.

Example 5-1: Hydrogenation Reduction Reaction of 2-Nitrobiphenyl, Flow Velocity 1 mL/min to 5 mL/min A Cylindrical Column Made of a Resin was Filled with the Pd Ion-Supported Weakly basic monolith anion exchanger where the amount of support of palladium was 1.0% by weight (size of catalyst cut out: 4.6 mm diameter×30 mm length (immersion in water)). Next, a substrate solution was prepared so that 0.3 mol/L of 2-nitrobiphenyl was in an ethanol solution, and the column was filled with the Pd ion-supported weakly basic monolith anion exchanger where the amount of support of palladium was 1.0% by weight (size of catalyst cut out: 4.6 mm diameter×30 mm length (immersion in water)). The substrate solution was fed at a flow velocity of the substrate solution of 1 mL/min to 10 mL/min, and a flow velocity of hydrogen gas of 50 mL/min to 100 mL at a temperature of the column of 80° C. and at a pressure increased to 0.3 MPa to 0.5 MPa by a back pressure valve, to perform hydrogenation reduction reaction. Table 5 shows the experiment results.

TABLE 5

| Flow velocity of substrate solution (mL/min) | SV ($h^{-1}$) | Flow velocity of hydrogen gas (mL/min) | Pressure (MPa) | Conversion (%) |
|---|---|---|---|---|
| 1 | 120 | 50 | 0.3 | 81 |
| 2 | 240 | 100 | 0.3 | 45 |
| 3 | 360 | 100 | 0.3 | 25 |
| 5 | 600 | 100 | 0.3 | 12 |
| 10 | 1200 | 100 | 0.5 | 7 |

Example 6-1: Preparation of Pt Catalyst with Hydrazine as Reducing Agent and Hydrogenation Reduction Reaction of 2-Nitrobiphenyl The platinum group metal-supported catalyst (Pt ion-supported weakly basic monolith anion exchanger) was reduced with an aqueous 3% hydrazine/monohydrate solution, and the resulting Pt nanoparticle-supported weakly basic monolith anion exchanger was washed with pure water several times and thereafter dried under reduced pressure, to thereby obtain a black Pt nanoparticle-supported weakly basic monolith anion exchanger.

A cylindrical column made of a resin was filled with the Pt nanoparticle-supported weakly basic monolith anion exchanger obtained (size of catalyst cut out: 4.6 mm diameter×30 mm length (immersion in water)). Next, a substrate solution was prepared so that 0.3 mol/L of 2-nitrobenzene was in an ethanol solution, and fed at a flow velocity of the substrate solution, of 0.5 mL/min, and a flow velocity of hydrogen gas of 25 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 2-aminobiphenyl, and the conversion into 2-aminobiphenyl after 0.5 h from liquid sending was 48%.

Example 6-2: Preparation of Pt Catalyst with Boron Sodium Hydride as Reducing Agent and Hydrogenation Reduction Reaction of 2-Nitrobiphenyl An aqueous 1 mol/L boron sodium hydride solution was added to the platinum group metal-supported catalyst (Pt ion-supported weakly basic monolith anion exchanger), and stirred at room temperature overnight, to thereby obtain a Pt nanoparticle-supported weakly basic monolith anion exchanger. The Pt nanoparticle-supported weakly basic monolith anion exchanger obtained was washed with pure water several times, and thereafter dried under reduced pressure, to thereby obtain a black Pt nanoparticle-supported weakly basic monolith anion exchanger.

A cylindrical column made of a resin was filled with the Pt nanoparticle-supported weakly basic monolith anion exchanger obtained (size of catalyst cut out: 4.6 mm diameter×30 mm length (immersion in water)). Next, a substrate solution was prepared so that 0.3 mol/L of 2-nitrobenzene was in an ethanol solution, and fed at a flow velocity of the substrate solution, of 0.5 mL/min, and a flow velocity of hydrogen gas of 25 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 2-aminobiphenyl, and the conversion into 2-aminobiphenyl after 0.5 h from liquid sending was 96%.

Example 6-3: Preparation of Pt Catalyst with Ethanol/Water as Reducing Agent and Hydrogenation Reduction Reaction of 2-Nitrobiphenyl To the platinum group metal-supported catalyst (Pt ion-supported weakly basic monolith anion exchanger) were added 30 mL of ethanol and 30 mL of water, which were heated and stirred under reflux conditions for 3 hours, to thereby obtain a Pt nanoparticle-supported weakly basic monolith anion exchanger. The Pt nanoparticle-supported weakly basic monolith anion exchanger obtained was washed with pure water several times, and thereafter dried under reduced pressure, to thereby obtain a black Pt nanoparticle-supported weakly basic monolith anion exchanger.

A cylindrical column made of a resin was filled with the Pt nanoparticle-supported weakly basic monolith anion exchanger obtained (size of catalyst cut out: 4.6 mm diameter×30 mm length (immersion in water)). Next, a substrate solution was prepared so that 0.3 mol/L of 2-nitrobenzene was in an ethanol solution, and fed at a flow velocity of the substrate solution of 0.5 mL/min, and a flow velocity of hydrogen gas of 25 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 2-aminobiphenyl, and the conversion into 2-aminobiphenyl after 0.5 h from liquid sending was 98%.

Example 6-4: Preparation of Pt Catalyst with Methanol/Water as Reducing Agent and Hydrogenation Reduction Reaction of 2-Nitrobiphenyl To the platinum group metal-supported catalyst (Pt ion-supported weakly basic monolith anion exchanger) were added 30 mL of methanol and 30 mL of water, which were heated and stirred under reflux conditions for 3 hours, to thereby obtain a Pt nanoparticle-supported weakly basic monolith anion exchanger. The Pt nanoparticle-supported weakly basic monolith anion exchanger obtained was washed with pure water several times, and thereafter dried under reduced pressure, to thereby obtain a black Pt nanoparticle-supported weakly basic monolith anion exchanger.

A cylindrical column made of a resin was filled with the Pt nanoparticle-supported weakly basic monolith anion exchanger obtained (size of catalyst cut out: 4.6 mm diameter×30 mm length (immersion in water)). Next, a substrate solution was prepared so that 0.3 mol/L of 2-nitrobenzene was in an ethanol solution, and fed at a flow velocity of the substrate solution of 0.5 mL/min, and a flow velocity of hydrogen gas of 25 mL/min at a temperature of the column of 80° C. and at a pressure increased to 0.3 MPa by a back pressure valve, to perform hydrogenation reduction reaction. Here, the SV of the substrate solution was 60 $h^{-1}$. The time during which the substrate solution and the catalyst layer were contacted was 1 minute in total. The reaction product was 2-aminobiphenyl, and the conversion into 2-aminobiphenyl after 0.5 h from liquid sending was 40%.

TABLE 6

| | Reaction system | Metal species | Carrier | Amount of support of metal (% by weight) | Amount of catalyst | Type of reducing agent | Substrate |
|---|---|---|---|---|---|---|---|
| Example 6-1 | Continuous flow | Pt | Weakly basic | 0.57 | Φ4.6 mm × 30 mm | Hydrazine | 2-Nitrobiphenyl |
| Example 6-2 | Continuous flow | Pt | Weakly basic | 0.57 | Φ4.6 mm × 30 mm | Boron sodium hydride | 2-Nitrobiphenyl |
| Example 6-3 | Continuous flow | Pt | Weakly basic | 0.57 | Φ4.6 mm × 30 mm | Ethanol/water | 2-Nitrobiphenyl |
| Example 6-4 | Continuous flow | Pt | Weakly basic | 0.57 | Φ4.6 mm × 15 mm | Methanol/water | 2-Nitrobiphenyl |

| | Concentration of substrate (mol/L) | Solvent | Flow rate of solution (mL/min) | Flow rate of hydrogen (mL/min) | Temperature (°C) | Pressure (MPa) | Conversion after 0.5 h (%) |
|---|---|---|---|---|---|---|---|
| Example 6-1 | 0.3 | Ethanol | 0.5 | 25 | 80 | 0.3 | 48 |
| Example 6-2 | 0.3 | Ethanol | 0.5 | 25 | 80 | 0.3 | 96 |
| Example 6-3 | 0.3 | Ethanol | 0.5 | 25 | 80 | 0.3 | 98 |
| Example 6-4 | 0.3 | Ethanol | 0.5 | 25 | 80 | 0.3 | 40 |

It was revealed from Table 6 that, even if platinum was reduced by various reducing agents, favorable hydrogenation reduction activity was exhibited.

As above, catalytic hydrogenation reduction reaction could be performed at a high conversion, according to the catalytic hydrogenation reduction method of Examples.

REFERENCE SIGNS LIST

1 skeleton phase, 2 hole phase, 10 co-continuous structure body, 11 rectangular image region, 12 skeleton portion, 13 macropore, 21 skeleton surface, 22*a*, 22*b*, 22*c*, 22*d*, 22*e* protrusion body, 50 catalytic hydrogenation reduction apparatus, 52 reaction container, 54 reaction substrate container, 56 reaction liquid receiver, 58 reaction substrate feed pump, 60 mixer, 62 switching valve, 64 hydrogen source feed pipe, 66 reaction substrate feed pipe, 68 reaction liquid discharge pipe, 70 circulation pipe.

The invention claimed is:

1. A catalytic hydrogenation reduction method, comprising:

contacting a reaction substrate and a hydrogen source in the presence of a platinum group metal-supported catalyst to perform catalytic hydrogenation reduction of the reaction substrate, wherein the platinum group metal-supported catalyst comprises at least one of platinum group metal ions, platinum group metal complex ions, and platinum group metal nanoparticles having an average particle size in the range of 1 to 100 nm is supported on an ion exchanger, the ion exchanger is a non-particulate weakly basic organic porous ion exchanger comprising a continuous skeleton phase and a continuous hole phase, in which a thickness of a continuous skeleton is in the range of 1 to 100 μm, an average diameter of continuous holes is in the range of 1 to 1000 μm, a total pore volume is in the range of 0.5 to 50 mL/g, an ion exchange capacity per weight in a dry state is in the range of 1 to 9 mg equivalents/g, and ion exchange groups are distributed in the ion exchanger, and the ion exchange group of the non-particulate weakly basic organic porous ion exchanger is at least one selected from the group consisting of a dimethylamino group, a diethylamino group, a dipropylamino group, a dibutylamino group, a methylhydroxyethylamino group, a methylhydroxypropylamino group, a dicyclohexylamino group, a pyrrolidyl group, a piperidyl group, a 2,2,6,6-tetramethylpiperidyl group, a morpholyl group, a methylamino group, an ethylamino group, a propylamino group, a butylamino group, a hydroxyethylamino group, and a hydroxybutylamino group.

2. The catalytic hydrogenation reduction method according to claim 1, wherein the non-particulate weakly basic organic porous ion exchanger has a continuous macropore structure having macropores connected to each other and common openings having an average diameter in the range of 1 to 1000 μm in walls of the macropores, a total pore volume is in the range of 1 to 50 mL/g, an ion exchange capacity per weight in a dry state is in the range of 1 to 9 mg equivalents/g, and ion exchange groups are distributed in the organic porous ion exchanger.

3. The catalytic hydrogenation reduction method according to claim 1, wherein the non-particulate weakly basic organic porous ion exchanger has a three-dimensionally continued skeleton portion formed by aggregation of organic polymer particles having an average particle size in the range of 1 to 50 μm, and has, between such skeletons, three-dimensionally continued holes having an average diameter in the range of 20 to 100 μm, in which a total pore volume is in the range of 1 to 10 mL/g, an ion exchange capacity per weight in a dry state is in the range of 1 to 9 mg equivalents/g, and ion exchange groups are distributed in the organic porous ion exchanger.

4. The catalytic hydrogenation reduction method according to claim 1, wherein the non-particulate basic organic porous ion exchanger is a continuous macropore structure body where bubble-like macropores are overlapped and such overlapped portions serve as openings having an average diameter in the range of 30 to 300 μm, a total pore volume is in the range of 0.5 to 10 mL/g, an ion exchange capacity per weight in a dry state is in the range of 1 to 9 mg equivalents/g, ion exchange groups are distributed in the organic porous ion exchanger, and a skeleton portion area appearing in a cross section in an SEM image of a cut surface of the continuous macropore structure body is in the range of 25 to 50% in an image region.

5. The catalytic hydrogenation reduction method according to claim 1, wherein the non-particulate basic organic porous ion exchanger is a co-continuous structure body comprising a three-dimensionally continued skeleton configured from an aromatic vinyl polymer containing a crosslinked structure unit in the range of 0.1 to 5.0% by mol in all constituent units with ion exchange groups introduced, the skeleton having a thickness in the range of 1 to 60 μm, and, between such skeletons, three-dimensionally continued holes having an average diameter in the range of 10 to 200 μm, a total pore volume is in the range of 0.5 to 10 mL/g, an ion exchange capacity per weight in a dry state is in the range of 1 to 9 mg equivalents/g, and ion exchange groups are distributed in the organic porous ion exchanger.

6. The catalytic hydrogenation reduction method according to claim 1, wherein the non-particulate basic organic porous ion exchanger comprises a continuous skeleton phase and a continuous hole phase, the skeleton has a plurality of particle bodies fixed to a surface and having a diameter in the range of 4 to 40 μm or a plurality of protrusion bodies formed on a skeleton surface of the organic porous ion exchanger and having a size in the range of 4 to 40 μm, an average diameter of continuous holes is in the range of 10 to 200 μm, a total pore volume is in the range of 0.5 to 10 mL/g, an ion exchange capacity per weight in a dry state is in the range of 1 to 9 mg equivalents/g, and ion exchange groups are distributed in the organic porous ion exchanger.

7. The catalytic hydrogenation reduction method according to claim 1, wherein an amount of the at least one of the platinum group metal atom in the at least one of the platinum group metal ions, the platinum group metal complex ions, and the platinum group metal nanoparticles is in the range of 0.01 to 10% by mass in terms of platinum group metal atom, relative to the catalyst.

8. The catalytic hydrogenation reduction method according to claim 1, wherein catalytic hydrogenation reduction of the reaction substrate is performed by continuously feeding the reaction substrate and the hydrogen source to a reaction container filled with the platinum group metal-supported catalyst and thus continuously contacting the reaction substrate and the hydrogen source in the presence of the platinum group metal-supported catalyst.

* * * * *